United States Patent
Veres et al.

(10) Patent No.: US 12,170,933 B2
(45) Date of Patent: Dec. 17, 2024

(54) TECHNIQUE OF DETERMINING A MEASURE OF PROXIMITY BETWEEN TWO DEVICES

(71) Applicant: Telefonaktiebolaget LM Ericsson (publ), Stockholm (SE)

(72) Inventors: András Veres, Budapest (HU); Péter Hága, Budapest (HU); Zsolt Kenesi, Budapest (HU); Máté Szebenyei, Budapest (HU); Dániel Makó, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 145 days.

(21) Appl. No.: 17/637,167

(22) PCT Filed: Oct. 7, 2019

(86) PCT No.: PCT/EP2019/077100
§ 371 (c)(1),
(2) Date: Feb. 22, 2022

(87) PCT Pub. No.: WO2021/069055
PCT Pub. Date: Apr. 15, 2021

(65) Prior Publication Data
US 2022/0284211 A1 Sep. 8, 2022

(51) Int. Cl.
*H04W 4/02* (2018.01)

(52) U.S. Cl.
CPC ......... *H04W 4/023* (2013.01); *G06F 2218/06* (2023.01); *G06F 2218/10* (2023.01); *G06F 2218/12* (2023.01)

(58) Field of Classification Search
CPC ............... H04W 4/023; G06F 2218/06; G06F 2218/10; G06F 2218/12; G06F 18/00;
(Continued)

(56) References Cited

U.S. PATENT DOCUMENTS 9,305,458 B2    4/2016   Rahimi et al.
2012/0214515 A1* 8/2012   Davis ............... H04W 4/024
                                                    455/456.6
(Continued)

OTHER PUBLICATIONS

Heaton, Jeff, "Artificial Intelligence for Humans, vol. 3: Depp Learning and Neural Networks", ISBN1505714346, available at https://www.amazon.com/Artificial-Intelligence-Humans-Learning-Networks/dp/1505714346, Dec. 2015.
(Continued)

*Primary Examiner* — Kenneth T Lam
(74) *Attorney, Agent, or Firm* — Murphy, Bilak & Homiller, PLLC

(57) ABSTRACT

Disclosed is a technique of determining a measure of proximity between two devices (4, 6). A method implementation of the technique comprises obtaining a first device signature comprising an indication of a first point in time and a first parameter characteristic of a first measurement performed by a first sensor (10) comprised in the first device (4); obtaining a second device signature comprising an indication of a second point in time and a second parameter characteristic of a second measurement performed by a second sensor (12) comprised in the second device (6); and determining, based on the first device signature and the second device signature, the measure of proximity between the first device (4) and the second device (6).

20 Claims, 15 Drawing Sheets

S2: Obtain first device signature

S4: Obtain second device signature

S6: Determine a measure of proximity between a first device and a second device based on the first device signature and the second device signature

(58) Field of Classification Search
CPC ............. G06F 2218/00; G06F 2218/08; G06F 2218/14; G06F 2218/16; G06F 2218/20; G06F 2218/22
See application file for complete search history.

(56) References Cited

U.S. PATENT DOCUMENTS

| | | | | |
|---|---|---|---|---|
| 2012/0263020 | A1* | 10/2012 | Taylor | H04W 64/00 367/124 |
| 2014/0059353 | A1* | 2/2014 | Picazo | H04W 4/023 713/176 |
| 2016/0007184 | A1* | 1/2016 | Kulikov | G01S 5/0284 455/41.2 |
| 2017/0055126 | A1* | 2/2017 | O'Keeffe | H04W 4/21 |
| 2017/0094464 | A1* | 3/2017 | Chu | G01S 1/00 |

OTHER PUBLICATIONS

Filliat, David, "A visual bag of words method for interactive localization and mapping", 2007 IEEE International Conference on Robotics and Automation, FrC14, Roma, Italy, Apr. 10-14, 2007, 6 pages.

Sablak, Sezai, et al., "Multilevel Color Histogram Representation of Color Images by Peaks for Omni-Camera", Proceedings of the IASTED International Conference Signal and Image Processing, Nassau, Bahamas, Oct. 18-21, 1999, 7 pages.

* cited by examiner

TECHNIQUE OF DETERMINING A MEASURE OF PROXIMITY BETWEEN TWO DEVICES

TECHNICAL FIELD

The present disclosure generally relates to device tracking. In particular, a technique for determining, based on device signatures, a measure of proximity between a first device that is mobile and a second device is presented. The technique may be implemented in the form of a method, an apparatus or a computer program product. Further, a device for generating a device signature is presented.

BACKGROUND

In several fields, tracking requires the determination of the location of a device in terms of absolute and relative position. Absolute tracking means that the position of the device is known in some fixed coordinate space such as Global positioning System, GPS, coordinates or a shelf number. In many cases, for example in logistics applications, there is room for a much coarser position estimate, and it is more informative to provide relative instead of absolute positions.

FIG. 1 shows parcels #1 to #3 and different ways of transportation thereof. Some parcels are carried together at some point, then they may be stored in the same room, then repackaged with other parcels and then shipped to their final destinations. When describing the position of the parcels in relative terms, it is of interest which parcels are packed in the same pellet, which truck they are travelling in and which room a parcel is in. A relative position describes the position of a device relative to other potentially moving objects, e.g., whether the device is in a specific container, in a cargo ship, or remote from another device.

Conventional device tracking methods use labels attached to devices and a method to read the labels and assign them to certain positions. For instance, bar codes or RFID tags can be attached onto devices and then scanned to assign them to the certain positions. Label-based tracking methods are tedious and prone to error. In particular, labels may be misread and assigned to a wrong location. Also, label reading usually is not highly automated.

Tracking systems based on a Global Navigation Satellite System, GNSS, are frequently used for tracking devices outdoors. GNSS signals cannot penetrate walls. Therefore, locations of devices which are contained within other objects, containers or inside vehicles cannot be reliably determined using GNSS.

Radio-based tracking relies on emitting a signal by the device and a subsequent triangulation by multiple base stations. Such positioning solutions have precision problems—even in an empty space their position accuracy is limited, but in a space filled with objects, their precision degrades significantly, for example due to fading of the emitted signals.

SUMMARY

There is a need for a technique that enables the determination of a relative position of a device with respect to another device.

According to a first aspect, a method of determining a measure of proximity between a first device that is mobile and a second device is provided. The method comprises obtaining a first device signature comprising an indication of a first point in time and a first parameter associated with the first point in time, wherein the first parameter is characteristic of a first measurement performed by a first sensor comprised in the first device. The method further comprises obtaining a second device signature comprising an indication of a second point in time and a second parameter associated with the second point in time, wherein the second parameter is characteristic of a second measurement performed by a second sensor comprised in the second device. Additionally, the method comprises determining, based on the first device signature and the second device signature, the measure of proximity between the first device and the second device. The method is in one variant a computer-implemented method, i.e., a method executed by a processor.

The measure of proximity can be a binary indication describing that the first device and the second device are in a same locally restricted (e.g., contained) environment, such as the same room, a same shipping container, a same parcel or else. The measure of proximity may be a value indicating a probability with which the first device and the second device are in a same room, a same shipping container, a same parcel or else. The measure of proximity may be a value describing a distance between the first device and the second device or a relative position of the first device and the second device.

In one variant, the first measurement consists of a first amount of information and the first parameter consists of an amount of information lower than the first amount. Additionally, or in the alternative, the second measurement may consist of a second amount of information and the second parameter may then consist of an amount of information lower than the second amount.

The first device signature may further comprise an indication of a third point in time and a third parameter associated with the third point in time. The third parameter may be characteristic of a third measurement performed by a third sensor comprised in the first device. According to one variant, the third measurement consists of a third amount of information and the third parameter consists of an amount of information lower than the third amount.

The second device signature for example further comprises an indication of a fourth point in time and a fourth parameter associated with the fourth point in time. For example, the fourth parameter is characteristic of a fourth measurement performed by a fourth sensor comprised in the second device. The fourth measurement may consist of a fourth amount of information. In this case, the fourth parameter may consist of an amount of information lower than the fourth amount.

The determination of the measure of proximity is in one example performed by a neural network.

The determining the measure of proximity may comprise correlating the first device signature and the second device signature. The correlating in one example comprises comparing the first point in time with the second point in time. The correlating may comprise comparing the first parameter with the second parameter.

In one variant, the correlating comprises comparing the third point in time with the fourth point in time. The correlating may comprise comparing the third parameter with the fourth parameter.

The first signature for example comprises at least one further entry chosen from: an indication of an amount of parameters comprised in the first signature; an indication of the sensor type of the first sensor; an indication of a point in time at which the first measurement was started by the first sensor; an indication of a timespan between the point in time at which the first measurement was started by the first sensor and the first point in time; an indication of the parameter type of the first parameter; an indication of the sensor type of the third sensor; an indication of a point in time at which the third measurement was started by the third sensor; an indication of a timespan between the point in time at which the third measurement was started by the third sensor and the third point in time; and an indication of the parameter type of the third parameter.

In one variant, the second signature comprises at least one further entry chosen from: an indication of an amount of parameters comprised in the second signature;

an indication of the sensor type of the second sensor; an indication of a point in time at which the second measurement was started by the second sensor; an indication of a timespan between the point in time at which the second measurement was started by the second sensor and the second point in time; an indication of the parameter type of the second parameter; an indication of the sensor type of the fourth sensor; an indication of a point in time at which the fourth measurement was started by the fourth sensor; an indication of a timespan between the point in time at which the fourth measurement was started by the fourth sensor and the fourth point in time; and an indication of the parameter type of the fourth parameter.

The sensor type for example indicates a physical property which the sensor is configured to measure. The first sensor and the second sensor are for example configured to measure a same physical property. In one example, the third sensor and the fourth sensor are configured to measure a same physical property. In one variant, the first sensor and the second sensor are configured to measure a physical property different from a physical property measured by the third sensor and the fourth sensor. The physical property measured by any sensor type may be one of vibration, sound, light, acceleration, rotation, magnetic field or temperature.

The first parameter and the second parameter are in one example parameters of a same parameter type. The third parameter and the fourth parameter may be parameters of a same parameter type. For example, the parameter type is one of a maximum value, a minimum value, a value above a predetermined threshold or a value below a predetermined threshold, wherein the value is a value of the measurement, a derivative of the measurement with respect to time, a Fourier-transform of the measurement, a quaternion of the measurement, a Mel spectrum of the measurement, a histogram of the measurement, or a wavelet-transform of the measurement.

In one example, at least one sensor chosen from the first sensor, the second sensor, the third sensor and the fourth sensor is a camera. For example, the first sensor is a camera. The first parameter may then be a value of a histogram of the first measurement by the camera. The histogram may then represent a color distribution of pixels contained in an image acquired by the camera as the first measurement. For example, the second sensor is a camera. The second parameter may then be a value of a histogram of the second measurement by the camera. The histogram may then represent a color distribution of pixels contained in an image acquired by the camera as the second measurement. For example, the third sensor is a camera. The third parameter may then be a value of a histogram of the third measurement by the camera. The histogram may then represent a color distribution of pixels contained in an image acquired by the camera as the third measurement. For example, the fourth sensor is a camera. The fourth parameter may then be a value of a histogram of the fourth measurement by the camera. The histogram may then represent a color is distribution of pixels contained in an image acquired by the camera as the fourth measurement. The image may be in RGB or HSV color space.

In one variant, at least one sensor chosen from the first sensor, the second sensor, the third sensor and the fourth sensor is a microphone. For example, the first sensor is a microphone. The first parameter may then be a value of a Fourier-transform of the first measurement or a wavelet-transform of the first measurement. For example, the second sensor is a microphone. The second parameter may then be a value of a Fourier-transform of the second measurement or a wavelet-transform of the second measurement. For example, the third sensor is a microphone. The third parameter may then be a value of a Fourier-transform of the third measurement or a wavelet-transform of the third measurement. For example, the fourth sensor is a microphone. The fourth parameter may then be a value of a Fourier-transform of the fourth measurement or a wavelet-transform of the fourth measurement.

In case at least one of the first, the second, the third and the third sensor is a microphone, the corresponding parameter may be a value of the corresponding measurement, the value describing a sudden temporal change in a spectrum of the corresponding measurement. For example, the first sensor is a microphone and the first parameter is a value of the first measurement, the measurement describing a sudden temporal change in a spectrum of the first measurement. For example, the second sensor is a microphone and the second parameter is a value of the first measurement, the measurement describing a sudden temporal change in a spectrum of the second measurement. For example, the third sensor is a microphone and the third parameter is a value of the third measurement, the measurement describing a sudden temporal change in a spectrum of the third measurement. For example, the fourth sensor is a microphone and the fourth parameter is a value of the fourth measurement, the measurement describing a sudden temporal change in a spectrum of the fourth measurement.

In one example, at least one of the sensors is a microphone and the corresponding parameter is a value of a Mel spectrogram of the first measurement. For example, the first sensor is a microphone and the first parameter is a value of a Mel spectrogram of the first measurement. For example, the second sensor is a microphone and the second parameter is a value of a Mel spectrogram of the second measurement. For example, the third sensor is a microphone and the third parameter is a value of a Mel spectrogram of the third measurement. For example, the fourth sensor is a microphone and the fourth parameter is a value of a Mel spectrogram of the fourth measurement. In each case, the Mel spectrogram may be a compressed spectrogram.

In one example, at least one sensor chosen from the first, the second, the third and the fourth sensor is a gyroscope, an acceleration sensor or an inertial motion sensor. In this case, the corresponding parameter may be a value of the corresponding measurement describing an amount of rotation of the respective device measured by the sensor. The corresponding parameter may in this case be a value of the corresponding measurement describing an incremental rotation of the respective device measured by the sensor, or a value of a quaternion of the corresponding measurement. For example, the first sensor is a gyroscope, an acceleration sensor or an inertial motion sensor. Then, the first parameter may be a value of the first measurement describing an amount of rotation of the first device measured by the first sensor. The first parameter may be a value of the first measurement describing an incremental rotation of the first device measured by the first sensor, or a value of a quaternion of the first measurement. For example, the second sensor is a gyroscope, an acceleration sensor or an inertial motion sensor. Then, the second parameter may be a value of the second measurement describing an amount of rotation of the second device measured by the second sensor. The second parameter may in this case be a value of the second measurement describing an incremental rotation of the second device measured by the second sensor, or a value of a quaternion of the second measurement. For example, the third sensor is a gyroscope, an acceleration sensor or an inertial motion sensor. Then, the third parameter may be a value of the third measurement describing an amount of rotation of the first device measured by the third sensor. The third parameter may in this case be a value of the third measurement describing an incremental rotation of the first device measured by the third sensor, or a value of a quaternion of the third measurement. For example, the fourth sensor is a gyroscope, an acceleration sensor or an inertial motion sensor. Then, the fourth parameter may be a value of the fourth measurement describing an amount of rotation of the second device measured by the fourth sensor. The fourth parameter may in this case be a value of the fourth measurement describing an incremental rotation of the second device measured by the fourth sensor, or a value of a quaternion of the fourth measurement.

According to a second aspect, an apparatus is provided. The apparatus comprises a processor configured to obtain a first device signature comprising an indication of a first point in time and a first parameter associated with the first point in time, wherein the first parameter is characteristic of a first measurement performed by a first sensor comprised in a first device. The processor is further configured to obtain a second device signature comprising an indication of a second point in time and a second parameter associated with the second point in time, wherein the second parameter is characteristic of a second measurement performed by a second sensor comprised in a second device. The processor comprised in the apparatus is further configured to determine, based on the first device signature and the second device signature, a measure of proximity between the first device and the second device.

The apparatus may further comprise a communication interface coupled to the processor and configured to obtain at least one device signature selected from the first device signature and the second device signature.

According to a third aspect, a device is provided which comprises a first sensor configured to perform a first measurement and generate first measurement data based on the first measurement. The device further comprises a processor, the processor being configured to obtain the first measurement data from the first sensor, and to determine, based on the first measurement data, a first parameter associated with a first point in time, wherein the first parameter is characteristic of the first measurement. The processor comprised in the device is further configured to generate a first device signature comprising an indication of the first point in time and the first parameter.

The processor comprised in the device in one example is further configured to determine a plurality of parameters based on the measurement data and to select at least one of the plurality of parameters as the first parameter.

The processor comprised in the device may be configured to implement an artificial neural network which is adapted to determine the first parameter. The artificial neural network may be adapted to perform at least one operation chosen from the determination of the plurality of parameters and the selection of the at least one parameter.

In one variant, the device further comprises an output interface configured to provide the first device signature to an apparatus, for example to the apparatus according to the second aspect.

According to one example, the device further comprises a third sensor configured to perform a third measurement and generate third measurement data based on the third measurement. In this case, the processor comprised in the device may be configured to obtain the third measurement data from the third sensor and to determine, based on the third measurement data, a third parameter associated with a third point in time, wherein the third parameter is characteristic of the measurement by the third sensor. This processor may be further configured to generate the first device signature comprising an indication of the first point in time, the first parameter, an indication of the third point in time and the third parameter.

According to a fourth aspect, a computer program is provided. The computer program comprises instructions which, when the program is executed by a processor, cause the processor to carry out the method of the first aspect.

According to a fifth aspect, a computer-readable medium is provided. The medium comprises the computer program according to the fourth aspect.

According to a sixth aspect, a data carrier signal is provided. The data signal carries information which represents the computer program according to the fourth aspect.

The term "parameter" used herein may also be referred to as "feature" which is characteristic of the respective measurement. It is to be understood that a referral to (e.g., an explanation in relation to) the first parameter may equally apply to the second parameter, the third parameter, the fourth parameter and vice versa, as far as applicable. In case it is referred to the first sensor, it is noted that similar technical teachings may apply to the second sensor, the third sensor and the fourth sensor and vice versa, as far as applicable. In case it is referred to a "parameter" in general, one or more of the aforementioned parameters is meant, as far as applicable. The same holds true for a referral to a "measurement" and a referral to a "sensor".

BRIEF DESCRIPTION OF THE DRAWINGS

Further details, advantages and aspects of the present disclosure will become apparent from the following embodiments taken in conjunction with the drawings, wherein.

DETAILED DESCRIPTION

Figure 1:
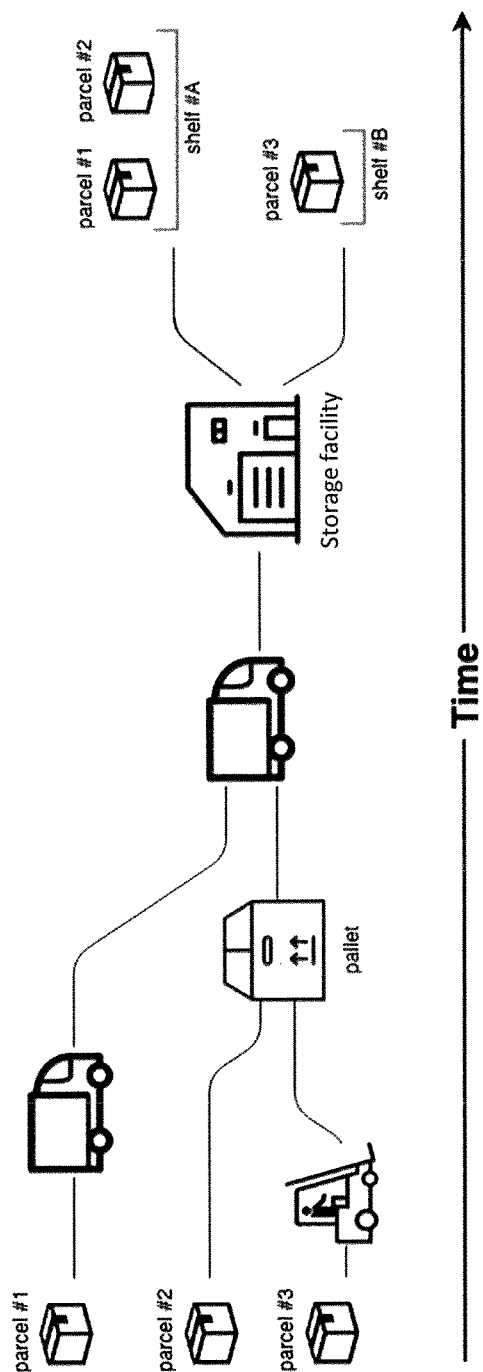
FIG. 1 shows exemplary logistical transport ways of different parcels.

In the following description, exemplary embodiments of a surgical navigation system is and a surgical navigation method will be explained with reference to the drawings. The same reference numerals will be used to denote the same or similar structural features.

FIG. 1 shows exemplary logistical transport ways for different parcels #1 to #3 that may benefit from the technique presented herein. As can be seen, parcels may be transported and stored individually or together. In particular parcels #2 and #3 are transported together on the same pallet, parcels #1 to #3 are stored together in the same storage facility, but partially on different shelves #A and #B. In order to determine, in certain embodiments, a relative position between two or more of the parcels #1 to #3, the present disclosure provides a technique as will be explained in the following. It will be apparent that the present disclosure can be practice in many other contexts as well.

Figure 2:
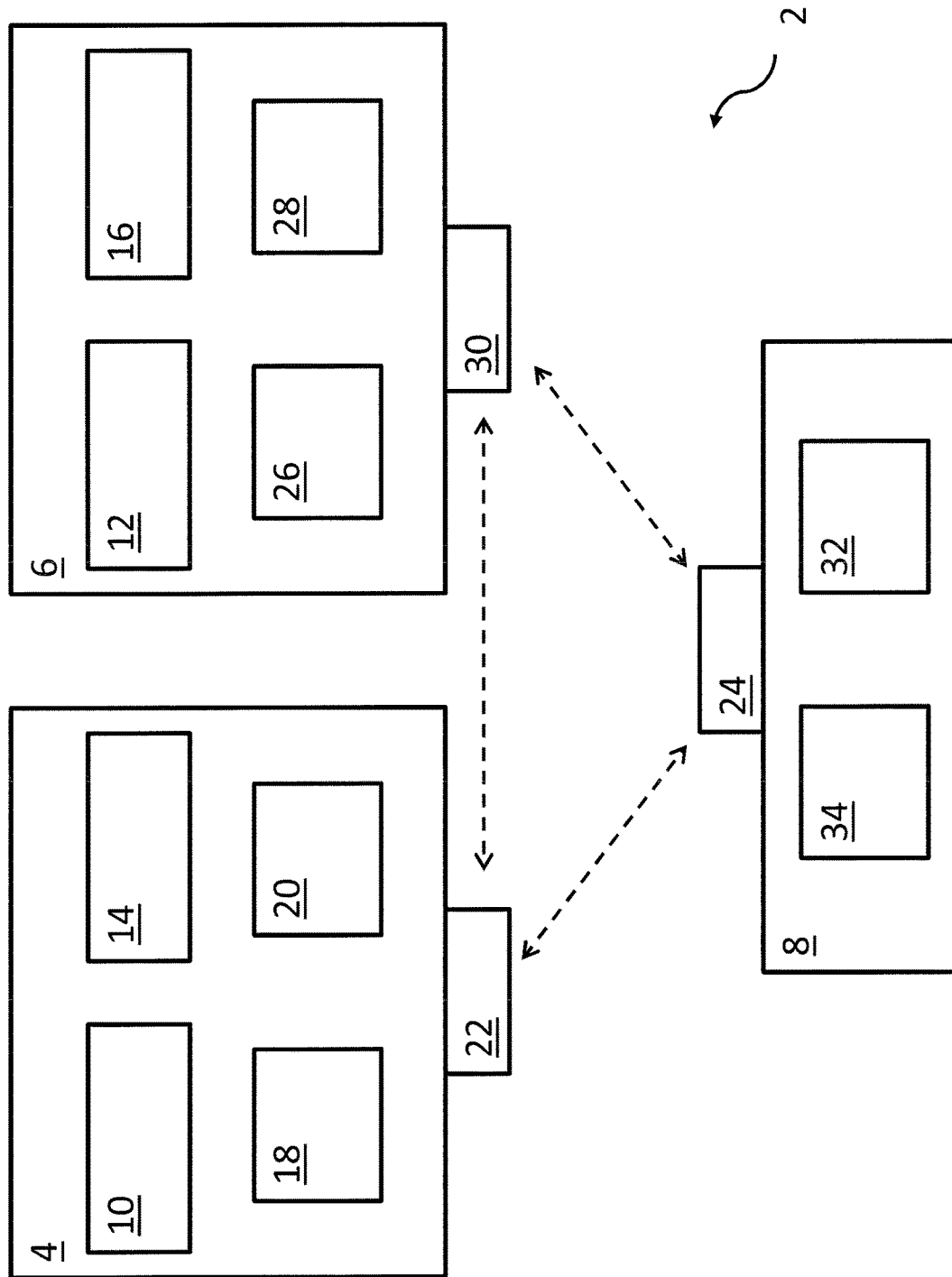
FIG. 2 illustrates a network system embodiment according to the present disclosure.

FIG. 2 shows a network system 2 comprising a first device 4, a second device 6 and an apparatus 8. The first device 4 is a mobile device and may be attached to or contained in a parcel such as parcel #1 of FIG. 1. The second device 6 may also be a mobile device (e.g., attached to a particular pallet in FIG. 1). In the shown example, the second device 6 is a stationary device with a known absolute position (e.g., a stationary device in the storage facility shown in FIG. 1 or attached to a particular shelf in FIG. 1).

The first device 4 comprises a first sensor 10 and the second device 6 comprises a second sensor 12. In addition, in some embodiments, the first device 4 comprises an optional third sensor 14 and the second device 6 comprises an optional fourth sensor 16. The first sensor 10 and the second sensor 12 are each configured to measure a same physical property. In addition, the third sensor 14 and the fourth sensor 16 are each configured to measure a same physical property. The measured physical property is for example vibration, sound, light, acceleration, rotation, a magnetic field or temperature. It should be noted that the first device 4 and the second device 6 may also include additional sensors.

The first sensor 10 is configured to perform a first measurement and generate first measurement data based on the first measurement, the second sensor 12 is configured to perform a second measurement and generate second measurement data based on the second measurement. Accordingly, the third sensor 14 is configured to perform a third measurement and generate third measurement data based on the third measurement and the fourth sensor 16 is configured to perform a fourth measurement and generate fourth measurement data based on the fourth measurement.

The first device 4 comprises a processor 18 which is configured to obtain the first measurement data from the first sensor 10 and the third measurement data from the third sensor 14. The data may then be stored in a data storage 20 comprised in the first device 4 or externally. The processor 18 is further configured to determine, based on the first measurement data, a first parameter associated with a first point in time, wherein the first parameter is characteristic of the first measurement. For example, in case of an audio signal measured as the first measurement (i.e., in case the first sensor 10 is a microphone), the processor 18 may extract a largest peak value of the audio signal as the first parameter. This peak value is associated with a certain point in time at which the peak occurred. This certain point in time is set as the first point in time. Similarly, the processor 18 is configured to determine, based on the third measurement data, a third parameter associated with a third point in time.

The processor 18 is configured to generate a first device signature comprising an indication of the first point in time and the first parameter. That is, the first device signature in the given example contains an absolute value of the extracted largest peak of the audio signal and the certain point in time at which the peak occurred at the first sensor 10 of the first device 4. The first device signature further comprises an indication of the third point in time and the third parameter.

Also, the first device signature comprises the following data elements (or a subset thereof): an indication of an amount of parameters comprised in the first signature, an indication of the sensor type of the first sensor 10, an indication of a point in time at which the first measurement was started by the first sensor 10, an indication of a timespan between the point in time at which the first measurement was started by the first sensor 10 and the first point in time, an indication of the parameter type of the first parameter, an indication of the sensor type of the third sensor 14 (if present), an indication of a point in time at which the third measurement was started by the third sensor 14, an indication of a timespan between the point in time at which the third measurement was started by the third sensor 14 and the third point in time, and an indication of the parameter type of the third parameter. The sensor type is indicative of the physical parameter measured by a particular sensor, such as the first sensor 10.

The first device signature may be stored in the data storage 20. An output interface 22 comprised in the first device 4 is configured to provide the first device signature to a communication interface 24 comprised in the apparatus 8. For example, the first device signature is transmitted by the output interface 22. In another example, the output interface 22 is connected to the data storage 20 and enables obtaining the first device signature from the data storage 20 via the output interface 22 by the apparatus 8. The amount of data transferred from the first device 4 to the apparatus 8 is smaller compared with a transmission of the complete first measurement data. In particular, the first parameter consists of an amount of information that is lower than the amount of information in the first measurement. For that reason, it can also be referred to an "extraction" of the first parameter from the first measurement. The same applies to the third parameter and the third measurement.

A corresponding configuration is provided in the second device 6. Namely, the second device 6 comprises a processor 26 and a data storage unit 28 as well as an output interface 30. The processor 26 is configured to obtain the second measurement data from the second sensor 12 and determine, based on the second measurement data, a second parameter associated with a second point in time. The second parameter is characteristic of the second measurement. Also, the processor 26 is configured to obtain fourth measurement data from the fourth sensor 16 and determine, based on the fourth measurement data, a fourth parameter associated with a fourth point in time. The fourth parameter is characteristic of the fourth measurement. As described above with reference to the first and second parameters, the third and fourth parameters each consist of an amount of information lower than the total amount of information of the third and fourth measurements.

The first and second parameters are of a same parameter type, and the third and fourth parameters are of a same parameter type. The parameter type is one of a maximum value, a minimum value, a value above a predetermined threshold or a value below a predetermined threshold. The value is a value of the measurement, a derivative of the measurement with respect to time, a Fourier-transform of the measurement, a quaternion of the measurement, a Mel spectrum of the measurement, a histogram of the measurement, or a wavelet-transform of the measurement. The first and the second parameter each can be expressed in a vector format. That is, the first parameter may be referred to as a first feature vector whereas the second parameter may be referred to as a second feature vector.

The processor 26 is further configured to generate a second device signature comprising an indication of the second point in time and the second parameter as well as an indication of the fourth point in time and the fourth parameter. The second device signature further comprises the following data items (or a subset thereof): an indication of an amount of parameters comprised in the second signature, an indication of the sensor type of the second sensor, an indication of a point in time at which the second measurement was started by the second sensor, an indication of a timespan between the point in time at which the second measurement was started by the second sensor and the second point in time, an indication of the parameter type of the second parameter, an indication of the sensor type of the fourth sensor (if present), an indication of a point in time at which the fourth measurement was started by the fourth sensor, an indication of a timespan between the point in time at which the fourth measurement was started by the fourth sensor and the fourth point in time, and an indication of the parameter type of the fourth parameter.

The second device signature may be stored in the data storage 28. The output interface 30 is configured to provide the second device signature to the communication interface 24 of the apparatus 8. The output interface 30 may also provide the second device signature to the first device 4 via the output interface 22. The output interface 22 may provide the first device signature to the second device 6 via the output interface 30. Different possible routes for transmitting one or both of the device signatures are indicated with dotted lines in FIG. 2.

The first device 4 and the second device 6 can be realized as Internet of things, IoT, devices so that the output interfaces 22 and 30 are able to connect to a network such as the Internet. The apparatus 8 may then be a cloud server which is connected to the same network via the communication interface 24. The first device 4 and the second device 6 may be configured to communicate via a wireless communication technology, such as the technology defined by $5^{th}$ Generation (5G) communication standards.

The apparatus 8 comprises a processor 32 which is configured to obtain the first device signature from the first device 4 and the second device signature from the second device 6 via the communication interface 24. Alternatively, the apparatus 8 may obtain both device signatures from only one of the first device 4 and the second device 6. The first device signature and the second device signature may then be stored in a data storage 34 comprised in the apparatus 8.

The processor 32 is configured to determine, based on the first device signature and the second device signature, a measure of proximity between the first device 4 and the second device 6. This determination can be performed by an artificial neural network, ANN. The determination comprises correlating the first device signature and the second device signature. In particular, the correlating comprises comparing the first point in time with the second point in time and comparing the first parameter with the second parameter. The correlating further comprises comparing the third point in time with the fourth point in time and comparing the third parameter with the fourth parameter.

For instance, the processor 32 is configured to determine whether the first device 4 is located in a same room as the second device 6. As another example, the processor 32 is configured to determine whether the first device 4 is located in a same shipment container as the second device 6. In other words, the determined measure of proximity corresponds to a relative location of the first device 4 with respect to the second device 6. As the second device 6 in the shown example has a known absolute position, an absolute position of the first device 4 can also be determined based on the determined measure of proximity. For instance, if it is determined that the first device 4 and the second device 6 are located within a same room, and the absolute position of the room is known due to the known absolute location of the second device 6, it can be determined that the first device 4 has the same absolute position as the second device 6, namely the absolute position of the same room. In other words, the apparatus 8 is configured to calculate, as the measure of proximity, a hit score for each potential device pair. In the case of only two devices such as the first device 4 and the second device 6, only one hit score is determined. The better the match of the device signatures, the higher is the hit score and the higher is the probability that these devices are in close proximity to one another.

A signal emitting unit may be provided at a known location such as in the back of a truck, in a shelf of a storage facility or in a shipment container. The signal emitting unit can emit a known physical signal such as sound, a light pattern, a magnetic field, a vibration or else. The known physical signal may then be used to determine a device signature. For example, the second device 6 is configured as the signal emitting unit and is configured to emit the known physical signal. The processor 26 can then be configured to determine the second device signature based on the known physical signal. No sensors need to be included in the second device 6 in this case as the second parameter can be determined based on the known physical signal. Also, as the location of the signal emitting unit, i.e., the second device 6, is known, a magnitude, size or time of a signal measured by the sensor(s) of the first device, which is configured to measure the physical signal, is influenced by the distance between the first device 4 and the signal emitting unit and possibly also by the relative orientations between the signal emitting unit and the first device 4. This enables the determination of a distance and a relative position between the first device 4 and the second device 6 based on the device signatures.

Figure 3:
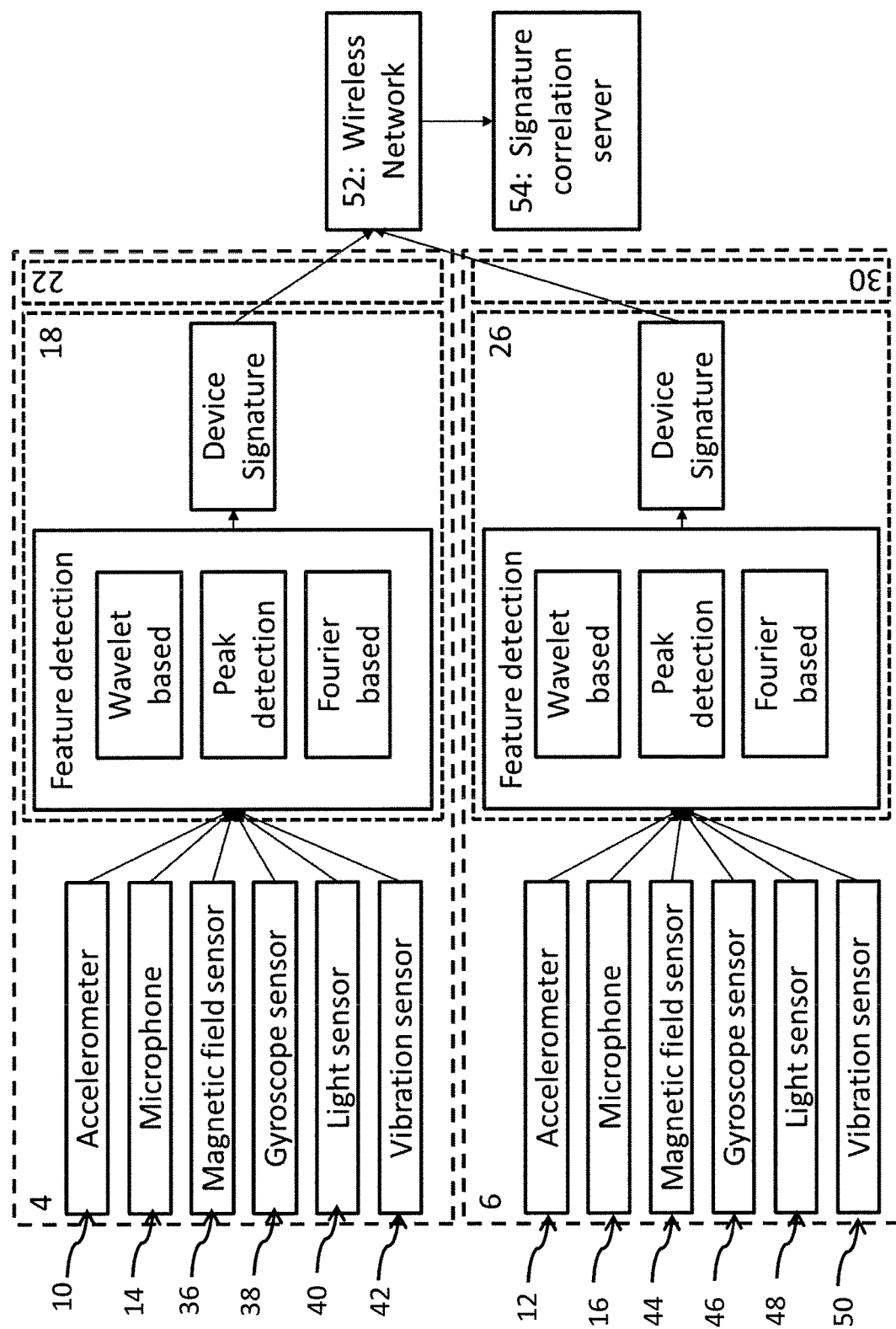
FIG. 3 illustrates a further network system embodiment according to the present disclosure that may be based on the embodiment of FIG. 2.

FIG. 3 shows a different schematic illustration of the system depicted in FIG. 2. In particular, individual processing steps and dedicated components are shown in FIG. 3 with reference to the individual components on which the processing occurs. In addition to the first sensor 10 and the third sensor 14, a plurality of further sensors 36, 38, 40 and 42 are comprised in the first device 4. Also, in addition to the second sensor 12 and the fourth sensor 16, several further sensors 44, 46, 48 and 50 are comprised in the second device 6. Of course, in some variants the first sensor 10, the second sensor 12, the third sensor 14 and the fourth sensor 16 may be realized by one of the sensors 36-42 and 44-50 shown in FIG. 3, for example light sensors or vibration sensors.

As can be seen, the determination of the first and third parameters based on individual measurement signals of the sensors 10, 14, 36, 38, 40 and 42 is performed by the processor 18 of the first device 4. The first or third parameter may be determined based on measurement signals of more than one sensor. For example, a parameter may be determined based on signals of several acceleration sensors, as will be described below with reference to FIG. 8. As another example, a peak detected in both an audio signal measured by the microphone 14 and a vibration signal measured by the vibration sensor 42 may be used as the first parameter.

The first and third parameters are determined wavelet-based, meaning based on a wavelet transformation applied onto the measurement signals. The first and third parameters can be determined Fourier-based (i.e., based on a frequency histogram) or by detecting peaks. Subsequently, the first device signature is generated by the processor 18 and transmitted via the output interface 22 to a wireless network 52. The first device signature is then transferred to a signature correlation server 54 which corresponds to the apparatus 8 shown in FIG. 1.

Also, the determination of the second and fourth parameters is performed by the processor 26 of the second device 6 based on measurement data obtained from the sensors 12, 16, 44, 46, 48 and 50. The second and fourth parameters are determined wavelet-based, Fourier-based (i.e., based on a frequency histogram) or by peak detection. Subsequently, the second device signature is generated by the processor 26. The second device signature is transmitted via the output interface 30 to the wireless network 52, from where it is transferred to the signature correlation server 54. The signature correlation server 54 may be a cloud server and corresponds to the apparatus 8. The signature correlation server 54 is configured to perform processing of the first and the second device signature and to determine the measure of proximity between the first device 4 and the second device 6 based on the first and the second device signatures.

Note that the processors 18, 26 may be configured to determine a plurality of parameters based on the available measurements and subsequently select the most relevant of these parameters as the first, second, third or fourth parameter. For this selection, an artificial neural network, ANN, may be implemented by the processors 18, 26. This ANN is preferably trained to select the parameters that give the best insight to the actual measurement data. In particular, during training, a wide range of measurement data is presented to the ANN, together with the correct measure of proximity. For instance, measurement data obtained by devices which are remote from one another and measurement data obtained by devices which are close to one another, for example in the same room, is used to train the ANN. As a result, a high accuracy in the selection of the parameters by the ANN can be obtained.

Figure 4:
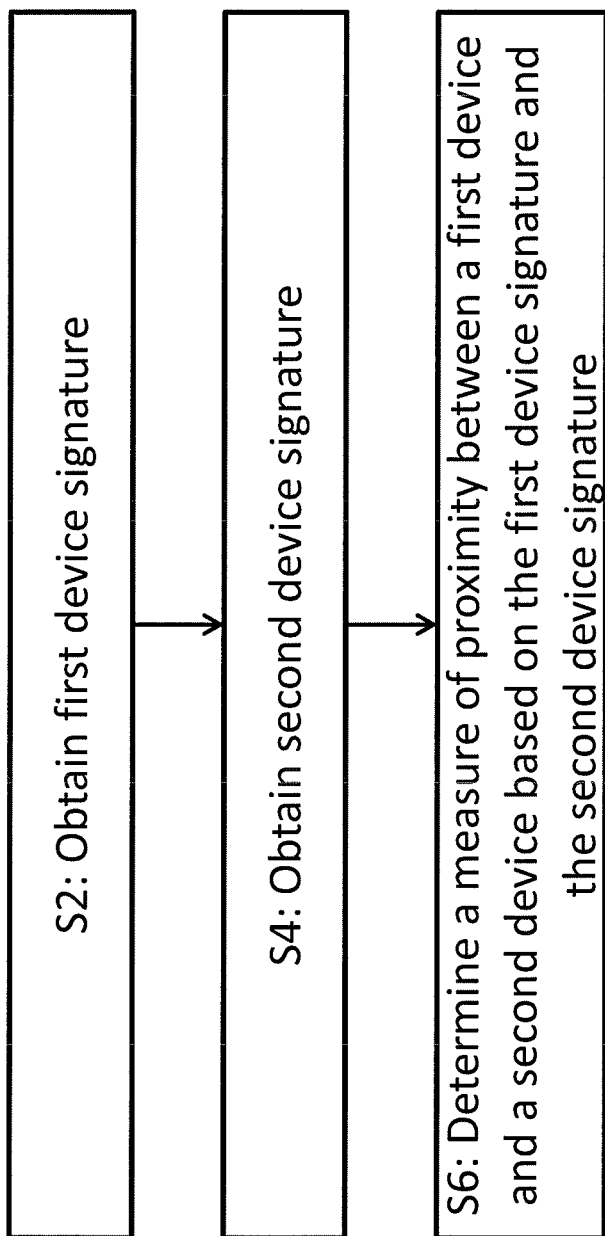
FIG. 4 illustrates a method embodiment according to the present disclosure.

FIG. 4 shows a flow chart of a method executed by the apparatus 8 described with reference to FIGS. 2 and 3 above.

In a first step S2, the apparatus 8 obtains the first device signature. In a second step S4, the apparatus 8 obtains the second device signature. In a third step S6, the apparatus 8 determines the measure of proximity between the first device and the second device based on the first device signature and the second device signature, as generally explained herein.

Note that the first step S2 and the second step S4 may be performed at the same time or in a reverse order. Obtaining the first device signature and obtaining the second device signature may comprise receiving the respective device signature, for example via output interfaces 22 and 30 and communication interface 24, or loading respective device signatures from a data storage, for example from one or more of data storages 20, 28 and 34.

Figure 5:
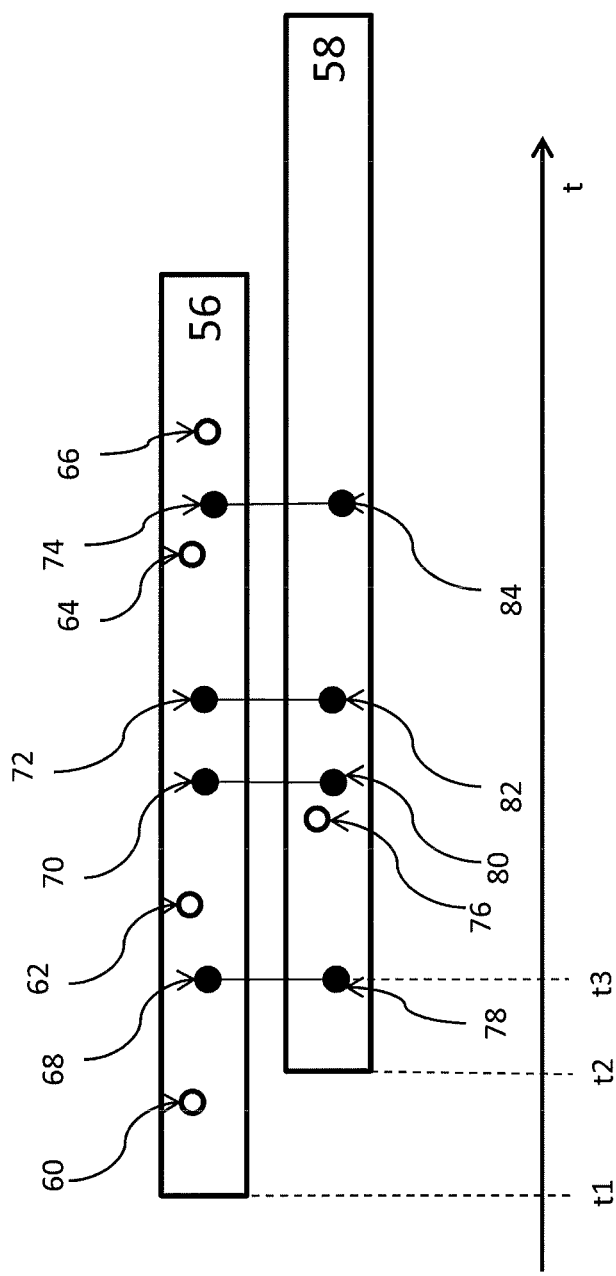
FIG. 5 illustrates a further method embodiment according to the present disclosure.

FIG. 5 shows an example of a first measurement 56 measured by the first sensor 10 and a second measurement 58 measured by the second sensor 12. The processor 18 of the first device 4 is configured to determine the first parameter based on this first measurement 56. In the shown example, the first measurement 56 contains a plurality of characteristic parameters. These characteristic parameters are denoted with reference signs 60 to 74. On the other hand, the processor 26 of the second device 6 is configured to determine the second characteristic parameter based on the second measurement 58. Characteristic parameters of the second measurement 58 are denoted with reference signs 76 to 84.

The first device signature in one example contains the parameter 68 as the first parameter associated with t3 as the first point in time. The second device signature contains the parameter 78 as the second parameter associated with t3 as the second point in time. As noted above, the first device signature further contains an indication of a point in time at which the first measurement was started by the first sensor 10 and an indication of the timespan between the point in time at which the first measurement was started by the first sensor 10 and the first point in time. In other words, the first device signature contains an indication of t1 and the timespan between t1 and t3. The second device signature also comprises such information, in particular an indication of t2 and the timespan between t2 and t3.

Due to this time information, the processor 32 comprised in the apparatus 8 is able to perform a time-matching between the first parameter and the second parameter. As indicated in FIG. 5, it is possible to compare the first point in time with the second point in time. Here, the first point in time t3 of the first parameter 68 corresponds to the second point in time t3 of the second parameter 78. In other words, the first point in time matches the second point in time. The same applies to points in time associated with parameters 70 and 80, parameter 72 and 82, and parameters 74 and 84, respectively. In difference thereto, points in time associated with parameters 60, 62, 64, 66 and 76 do not match with parameters obtained from the other measurement signal. In addition to comparing the first point in time with the second point in time, the processor 32 can compare the first parameter with the second parameter.

For example, the first measurement 56 and the second measurement 58 are obtained by microphones. In this case, the individual parameters may correspond to peaks detected in the audio signals. Due to a different location of the first device 4 with respect to the second device 6, different audio signals are obtained. For example, the first device 4 may be arranged in the back of a truck in close proximity to a door, whereas the second device 6 may at the same time be arranged in the back of the truck remote from the door. Sounds generated at the door may thus only be detected by the microphone of the first device 4 as the parameters 60, 62, 64 and 66. At the same time, larger sounds can be detected with the microphones of the first device 4 and the second device 6 as the parameters 68, 78, 70, 80, 72, 82, 74 and 84. As a plurality of time points associated with the parameters matches between the first measurement 56 and the second measurement 58, it can be determined as the measure of proximity that first device 4 and the second device 6 are in a same room, or in the back of a same truck. At the same time, it can be determined that both devices are not in close proximity to one another as several parameters contained in the device signatures do not match. In order to avoid erroneous determination results, the first parameter that timely matches a second parameter may be compared therewith. In the current example, amplitude values of peaks detected in the audio signals as the first and second parameters may be compared with one another. In case both values lie within a certain range and are of a same type (i.e., a maximum amplitude value), these two parameters are classified as matching parameters and the result of the previous time-matching is approved. As a result, it is determined as the measure of proximity that the first device 4 and the second device 6 are in close proximity to one another.

The processor 18 may be configured to determine a plurality of parameters based on the first measurement data and to select at least one of the plurality of parameters as the first parameter. The processor 18 for example implements ANN adapted to determine the first parameter. One example of such an ANN is a convolutional neural network, CNN, that is configured to determine a plurality of parameters based on the first measurement using parameter detection algorithms. In other words, the processor 18 is configured to extract a characteristic property or a characteristic feature of the first measurement as the first parameter. The first parameter is later compared with a second parameter of the same parameter type in order to correlate different device signatures.

Figure 6:
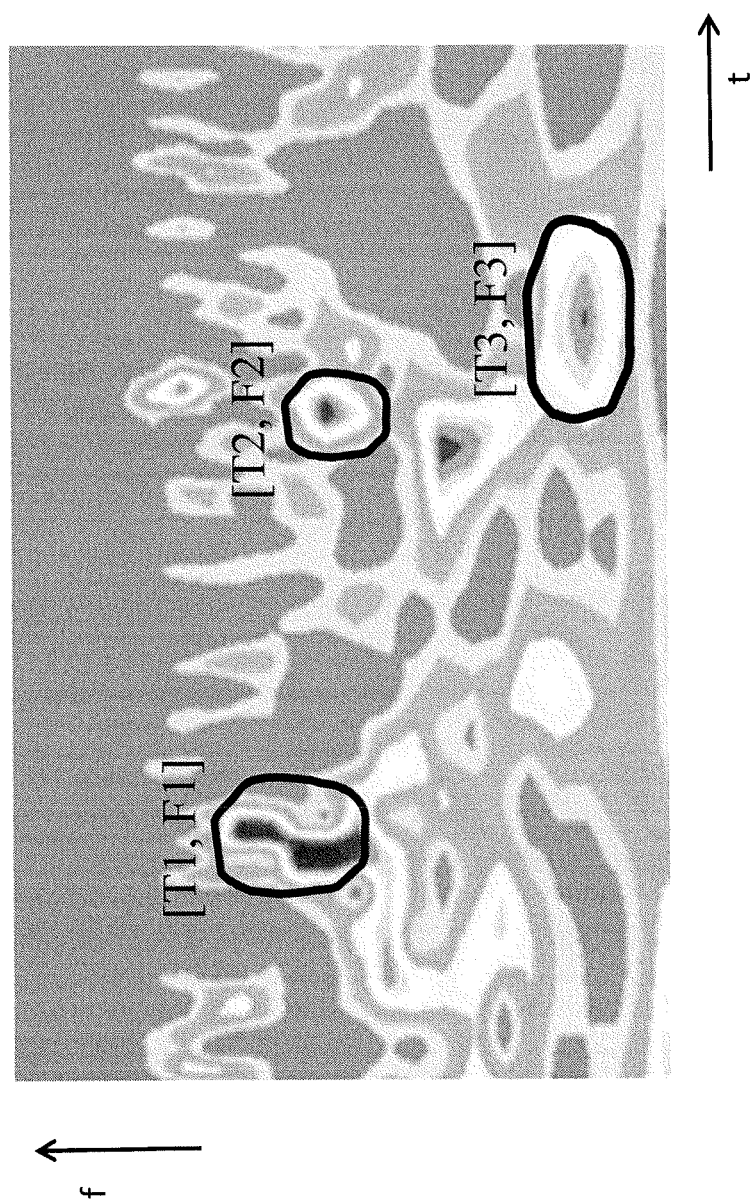
FIG. 6 illustrates an exemplary first measurement of a vibration sensor.

FIG. 6 shows an exemplary first measurement obtained by the first sensor 10 of the first device 4. In this case, the first sensor 10 is a vibration sensor. The abscissa indicates time whilst the ordinate indicates frequency. Different shadings indicate different amplitudes. In the shown diagram, regions with high amplitudes can be identified as characteristic of the first measurement. These regions are indicated by circles in FIG. 6 and may each or all be used as the first parameter. The time and frequency of each of the regions can be described by two-component vectors denoted as [T1, F1], [T2, F2] and [T3, F3], respectively. In the shown example, these two-component vectors describe a time and frequency of a maximal amplitude which lies in a region indicated with a circle in FIG. 6. One or more of the frequencies F1, F2 and F3 may be used as the first parameter associated with the point in time T1, T2 or T3, respectively. Alternatively, vectors with a higher dimension describing the circles shown in FIG. 6 or a range of time and a range of frequency may be used. Each vector describes a parameter characteristic of the first measurement and a point in time associated with the parameter. Instead of detecting maximal amplitudes, patterns in the time-frequency diagram may be detected as the parameters characteristic of the first measurement. For this purpose, the processor 18 may implement an ANN.

Figure 7:
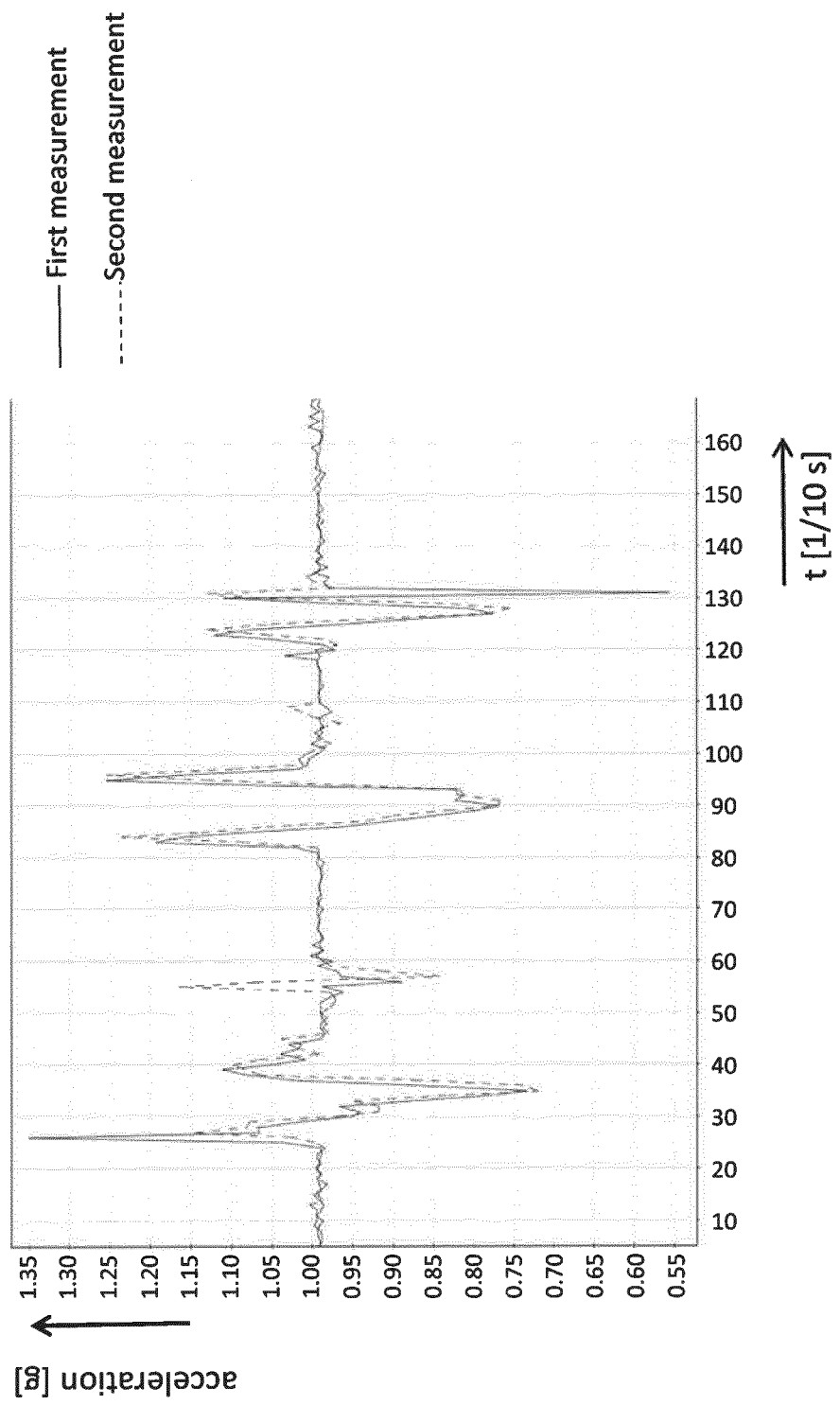
FIG. 7 illustrates exemplary first and second measurements of acceleration sensors.

In FIG. 7, a first measurement of the first sensor 10 and a second measurement of the second sensor 12 are shown. In this case, the first sensor 10 and the second sensor 12 are acceleration sensors. In the shown example, the first device 4 and the second device 6 were placed in a common parcel which was then moved by hand.

It can be seen that the first measurement is highly similar to the second measurement. In particular, time points at which the first measurement shows maxima and minima are closely similar to time points at which the second measurement shows maxima and minima. In case a maximum of the first measurement signal at a first point in time (for example at 0.95 s) is determined as the first parameter, and a maximum of the second measurement signal at a second point in time (for example at 0.96 s) is determined as the second parameter, the apparatus 8 can compare the first point in time with the second point in time based on the obtained device signatures. In the example, a deviation between these points in time is derived during time-matching of the first device signature and the second device signature as 0.96 s−0.95 s=0.01 s. The apparatus 8 determines that, due to the same type of parameter and due to the closely similar points in time with which the parameters are associated, the first device 4 and the second device 6 are in close proximity to one another as they exhibit closely similar temporal acceleration.

The absolute parameter values may also be compared to one another. In this example, the first parameter and the second parameter both have an acceleration value of about 1.255 g. This means that the first device signature and the second device signature are not only highly correlated with respect to the first and second points in time, but also with respect to the values of the first and second parameter. Consequently, the apparatus 8 determines that the first device 4 and the second device 6 are in close proximity to one another. In other words, a co-locality of the two devices 4 and 6 can be proven by the apparatus 8 based on the first and second device signatures generated from the measurements shown in FIG. 7.

The first and second parameters may each be determined based on more than one measurement signal. In particular, according to a more advanced inertial measurement unit, IMU, based method, a short time scale rotation of the first device 4 or the second device 6 is sampled based on sensor fusion, i.e. based on superimposed measurement signals of several sensors. A commonly available 6-axis fusion of an accelerometer and a gyroscope, usually called game sensor or game rotation sensor, may be used in order to determine the first parameter or the second parameter. Even if the first device 4 and the second device 6 have different initial rotational positions, if they are moving together, they experience a similar sequence of rotations. Using quaternions, the relation between the original position P1 and the new position P2 can be expressed as:

$$P_2 = Q^c \times P_1 \times Q,$$

where Q expresses the rotation between points $P_1$ and $P_2$, and $Q^C$ is the conjugate of Q. A convenient property of quaternions is that successive rotations are multiplications, i.e.: $Q^c = K \times Q_1$, so the new rotation quaternion $Q_2$ is a multiplication of the previous rotation $Q_2$ and the further rotation of K. If two devices are handled together, regardless of their prior rotational history, they will experience similar incremental rotations. In practice, the incremental rotation K can be determined from a current and previously sampled normalized quaternions:

$$K = Q_2 \times Q_1^c.$$

The choice of sampling frequency will impact whether small timescale motion or large motions are sought to be detected as the (i.e., first, second, third or fourth) parameter. Device signatures in which the first, second, third or fourth parameter is based on quaternions tend to provide better results than device signatures in which the parameter corresponds to an absolute accelerometer measurement value. That is because fine motions can be detected with high precision and low noise based on quaternions.

Figure 8:
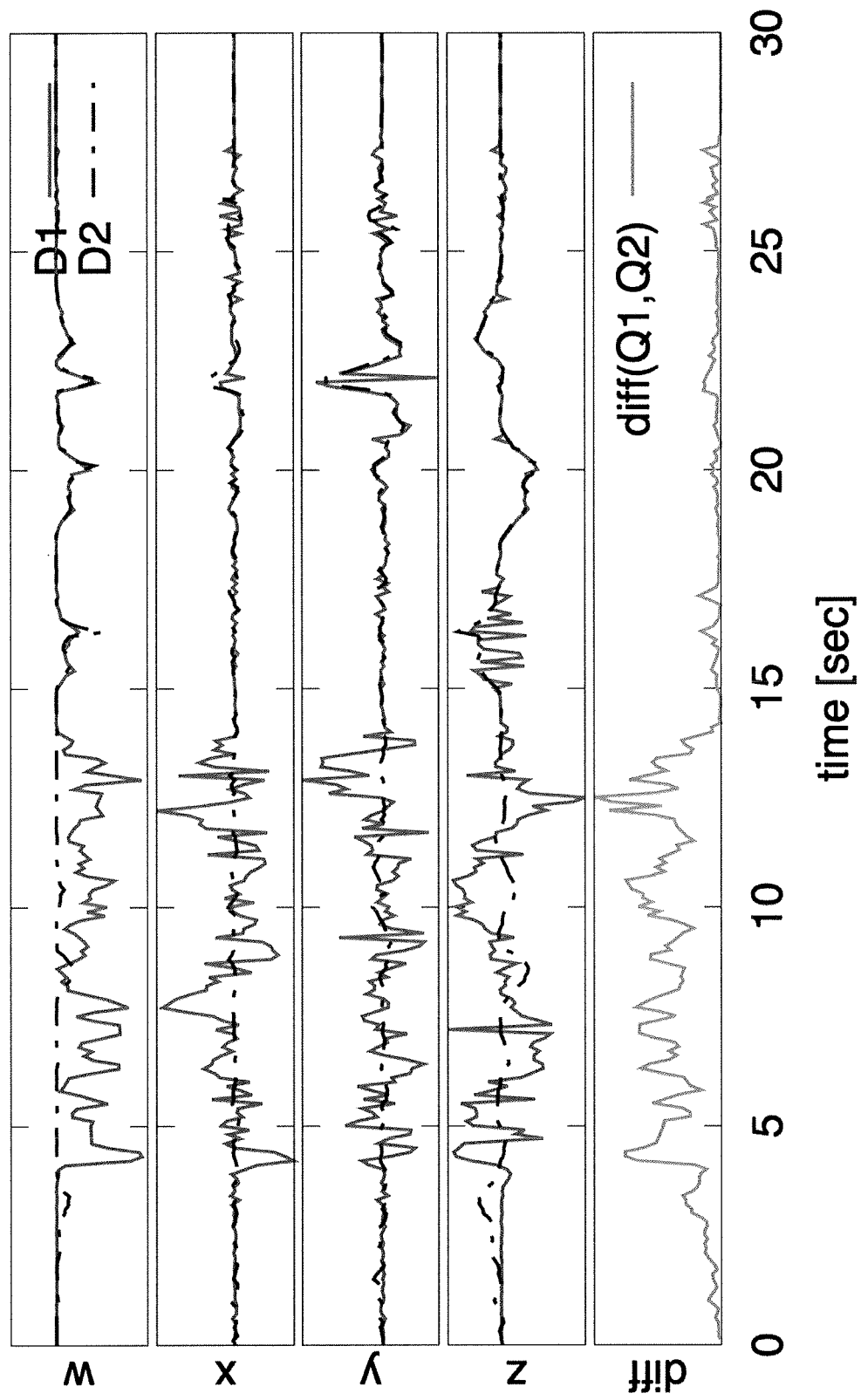
FIG. 8 illustrates exemplary first and second measurements of game rotation sensors.

FIG. 8 shows measurement results of an experiment where the first device 4 and the second device 6 were first transported separately (between 0-15 sec) and then transported in a same container (between 15-30 sec). In this diagram, measurements obtained by a game rotation sensor are indicated as w, x, y and z. The measurements of the game rotation sensor comprised in the first device 4 are shown in the top four diagrams with a solid line and denoted as "D1", whereas the measurements of the game rotation sensor comprised in the second device 6 are shown in these diagrams with a dashed line and denoted as "D2". A 100 ms sampling of K was used, which optimizes for small to medium time-scale signature matching.

The bottom diagram shown in FIG. 8 represents an Euclidean length of rotational quaternion vector differences, wherein the rotational quaternion vectors are derived from the measurements of the game rotation sensors comprised in the first device 4 and the second device 6, respectively. As the first and second parameters included in the device signatures, maxima or minima of the measurements w, x, y and z or a quaternion vector comprising values of w, x, y and z at a certain point in time can be determined. Alternatively or additionally, certain patterns may be detected in the measurements w, x, y and z as the parameters, for instance by an ANN implemented by the processor 18 of the first device 4 or the processor 26 of the second device 6.

It can be seen that, when the two devices 4 and 6 are carried together (between 15-30 sec), the values of measurements w, x, y and z, which are the quaternion vector values, are very similar. Also, the Euclidean length of the rotational quaternion vector differences shown in the bottom diagram is significantly smaller than when the first device 4 and the second device 6 are carried separately by two persons (between 0-15 s). This enables the determination by the apparatus 8 that during 0-15 s, the first device 4 and the second device 6 are transported separately from one another, whilst during 15-30 s, the first device 4 and the second device 6 are transported together as they experience the same incremental rotations.

A 6-axis IMU such as a game rotation sensor generally has larger power consumption than a regular acceleration sensor. The power consumption can be minimized by keeping the sensor powered down for most of the time. This approach is feasible because only measurement samples of increments at a low rate are required compared to a full history of rotations. The sensor may only be activated when motion is detected by an ultra-low power accelerometer. The first measurement may be started by the first sensor 10 upon a signal of the third sensor 14.

As noted above, microphones may be comprised as sensors in the first device 4 and the second device 6. Microphones may detect similar sound patterns in an environment. The two devices 4 and 6 may experience a significant amount of additional, different noise even if they are in the same room. In order to obtain useful information about the location of the first device 4 and the second device 6 based on measurements of microphones as the first sensor 10 and the second sensor 12, the parameters characteristic of the measurements are determined by the processors 18 and 26.

In order to determine whether the first device 4 and the second device 6 are in close proximity to one another, a decision function can be used. In the following decision function f, $A_1$ denotes the first measurement obtained by a microphone as the first sensor 10 and $A_2$ denotes the second measurement obtained by a microphone as the second sensor 12. Each of these measurements can be considered as a sum of a sound pattern C with some attenuation $\alpha$ and $\beta$ (potentially time dependent) while all the other sound in the measurement considered as background sounds is denoted by $N_1$ and $N_2$:

$$A_1 = \alpha \times C + N_1;$$

$$A_2 = \beta \times C + N_2.$$

Since the sound pattern C can be very weak and the background noise $N_1$ and $N_2$ can be strong compared to the sound pattern C, the following conditions hold:

$$\alpha, \beta << 1$$

$$\alpha \times C << N1$$

$$\beta \times C << N2.$$

The processor 32 of the apparatus 8 is configured to use the decision function f that enables a decision whether the two measurements $A_1$ and $A_2$ contain the same sound pattern C:

$$f(A_1, A_2) = \begin{cases} 1 & \text{if } \alpha \neq 0, \beta \neq 0 \\ 0 & \text{otherwise} \end{cases}$$

To demonstrate the task of finding such a function f, Mel spectral analysis can be used in order to compress a Mel spectrogram of each of the measurements $A_1$ and $A_2$, respectively.

Figure 9:
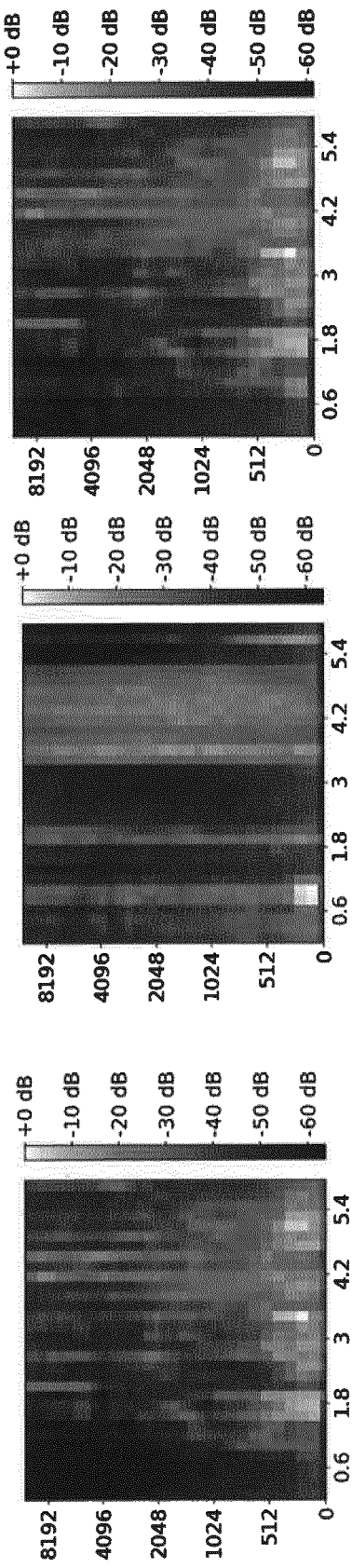
FIG. 9 illustrates two exemplary measurements of microphones and a superposition of these measurements.
Figure 9:
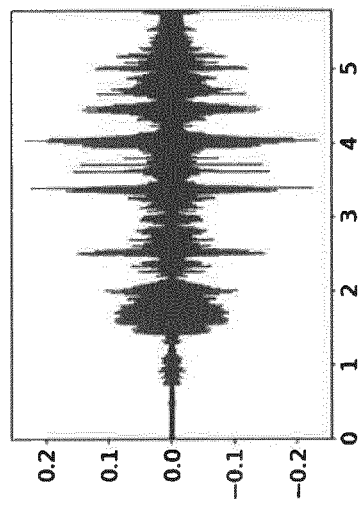
Figure 9:
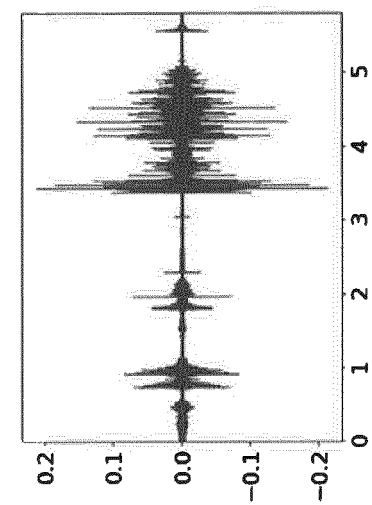
Figure 9:
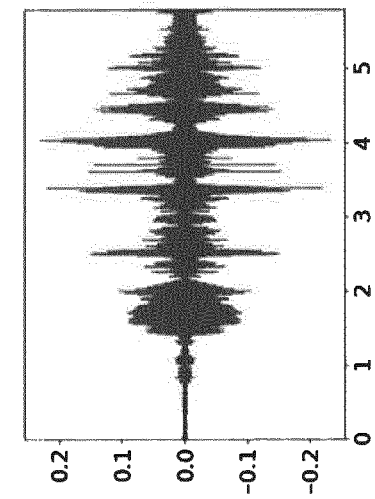

FIG. 9 shows exemplary measurements $A_1$, $A_2$ and a weighted superposition B of these measurements in the bottom row, wherein the superposition B consists of 80% of the intensity of $A_1$ and 20% of the intensity of $A_2$. The measurements $A_1$ and $A_2$ in the provided example were taken with a 22 kHz raw sample rate, and a Fast Fourier Transform, FFT, window size of 4096. For each of the measurements $A_1$ and $A_2$ as well as for superposition B, corresponding compressed Mel spectrograms are shown in FIG. 9 in the top row. In this example, the Mel spectrograms were compressed to a 32×32 matrix.

It can be seen that while the original waveform of the measurement $A_2$ is almost not visible in the waveform of superposition B, the specific patterns of both the spectrograms of $A_1$ and $A_2$ can be recognized in spectrogram of B. In case the weighting of measurement $A_2$ is decreased in superposition B, the recognition of the measurement $A_2$ in the waveform or the compressed Mel spectrogram of B gets impossible for human senses.

The parameter extraction and signature generation should be performed by the devices 4 and 6, while the determination of the measure of proximity should take place in a cloud component such as the signature correlation server 54. To prove feasibility of the use of an ANN for parameter extraction and signature generation and also use of an ANN for determining the measure of proximity, in the following, a machine learning solution is presented that includes all of the determination of the characteristic parameter, the determination of the device signatures and the determination of the final decision, i.e., of the measure of proximity.

Figure 10:
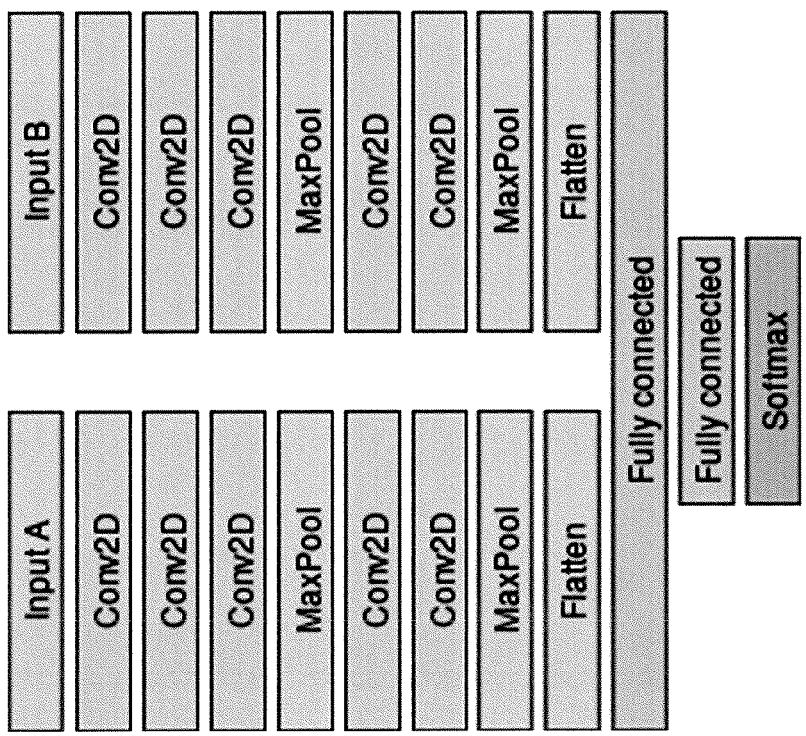
FIG. 10 illustrates an exemplary embodiment of an neural network according to the present disclosure.

FIG. 10 shows an exemplary structure of a Siamese ANN. The Siamese ANN contains two separated input branches and a common part. The separated input branches illustrate the devices' parameter extraction and signature determination and the common part embodies the cloud's signature processing and determination of the measure of proximity. The left branch of the Siamese ANN may be implemented as an ANN by the processor 18 of the first device 4. The right branch of the Siamese ANN may be implemented as an ANN by the processor 26 of the second device 6. The common layer may be implemented by the processor 32 of the apparatus 8. The Siamese ANN shown in FIG. 10 is designed to find similarities between two recorded sound sequences, i.e., between the first measurement $A_1$ and the second measurement $A_2$. For testing the similarity, recorded sound sequences were in an experiment split into 5.8 sec long sequences and their distinct spectrograms were calculated. The spectrograms contain a correlation in both the time and frequency domains of the recorded sound sequences.

The correlations between the spectrograms of the individual sequences can be extracted effectively with convolutional layers that are organized as follows (see FIG. 10): the two input branches contain the same layers in the same order: a Convolutional (16,3,3), a Convolutional (16,3,3), a Maxpooling (4,4) to reduce dimensions of the activation maps and the number of parameters, a Convolutional (16, 3,3) and a Maxpooling (4,4) layer. The two branches are attached with a fully connected layer and the network's output layer contains two neurons with Softmax activation function.

During a training process of the Siamese ANN, in the experiment, a large number of sound records (of 5.8 sec length) from various environments were used and an audio mixing process was applied as a data augmentation step. In the mixing process, a random sound record $R_1$ was used as one of the inputs while a mixed record $A_m$ was used as the other input. The mixed record $A_m$ was calculated as a weighted average of the sound record $R_1$ and a randomly selected sound record $R_2$. By using this mixing process, the amount of the available training data was increased. Also, training data pairs were generated that contained adjustable fractions of $R_i$ beside $R_2$. An example for such a mixing process was mentioned above with reference to FIG. 8, in which B corresponds to $A_m$, $A_1$ corresponds to $R_2$ and $A_2$ corresponds to $R_1$. According to the mixing process, the sound recordings $A_m$ are calculated as follows:

$$A_m = \alpha \times R_1 + \beta \times R_2.$$

For $0.2 < \alpha < 1$, $0 < \beta < 1$, the input record pairs $R_1$ and $R_2$ were considered as matching (i.e., true) sound patterns, which should lead to a determination that the first device 4 and the second device 6 are in close proximity to one another or in a same room. For $\alpha = 0$, the selected pairs were considered as non-matching (i.e., false or independent) sound patterns, which should lead to a determination that the first device 4 and the second device 6 are not in close proximity to one another or not in a same room.

The training dataset finally contained 64.000 record pairs. This number was doubled (to 128.000 records) due to a swapping of pairs to ensure an identical training of the two branches of the Siamese ANN shown in FIG. 10. The dataset was split into 80% used for training of the Siamese ANN and 20% used for validating the Siamese ANN. The neural network was implemented in Keras. A Nesterov-Adam optimizer was used with 0.001 learning rate. As loss function, a categorical cross entropy was used. Early stopping was applied to avoid overtraining, after 40 epochs the ANN reached 0.7374 accuracy and 0.7954 validation accuracy. The difference between training and validation accuracy is due to a used dropout layer that deactivates neurons during training of the ANN but activates them during validation of the ANN. This dropout layer was located between the two fully connected layers and is used to avoid overfitting.

Figure 11:
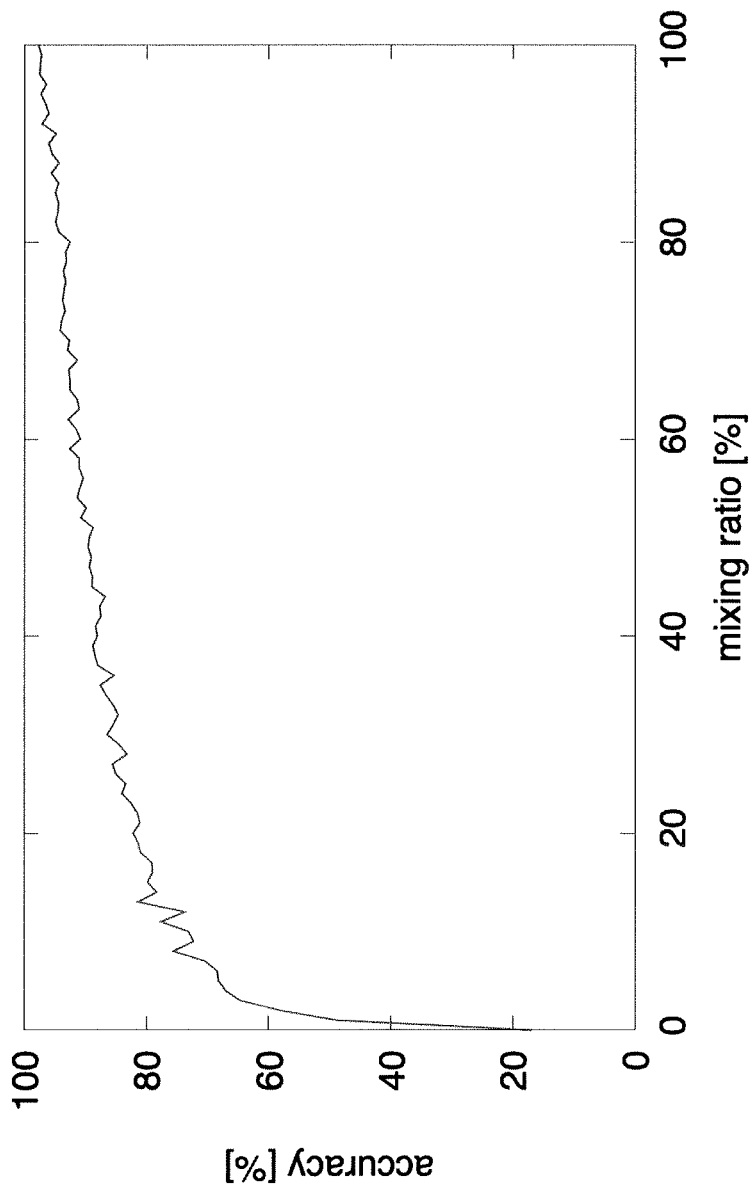
FIG. 11 illustrates experimental results of sound similarity prediction using an neural network.

The validation results of the Siamese ANN of FIG. 10 are shown in FIG. 11. The mixing ratio in this figure means the weighting of sound recording $R_1$ that was used during mixing to generate the different superimposed recordings $A_m$. The accuracy in this figure means the percentage of correct decisions determined by the Siamese ANN. In particular, in case the Siamese ANN determined that the first device 4 and the second device 6 are in close proximity to one another based on two superimposed patterns $A_m$, whilst these patterns $A_m$ did not contain the same pattern $R_1$, this determination was incorrect. On the other hand, in case the Siamese ANN determined that the first device 4 and the second device 6 are in close proximity to one another based on two superimposed patterns $A_m$, whilst these patterns $A_m$ did contain the same pattern $R_1$, this determination was correct. As can be seen, the higher the mixing ratio, the higher the accuracy. This is because the influence of the randomly selected $R_2$ decreases with higher mixing ratios, enabling a more accurate decision by the Siamese ANN based on two different superimposed recordings $A_m$. Further experiments with different record lengths showed that for records containing highly similar sound patterns (above 80% mixing ratio), the accuracy is above 80% even for short (5.8 sec) records, while it was above 95% for longer (11.6 and 17.4 sec) records. For low mixing ratios (below 20%) a longer record length has clear advantage as it can still achieve a high accuracy.

Performing audio sampling, analog-digital, AD, conversion and Fast Fourier Transformation, FFT, of the measurements measured by the sensors comprised in the first and second device 4 and 6 would require much power which is disadvantageous for a battery-based device 4 or 6. In order to save power, very low power MEMS sensors with very low power wake-up capability may be used. For example, a sensor using a so-called zero power operation may be used, which means that the detection works by utilizing the energy harvested from the sound wave itself. The sensor should sensitive to a relatively broad range of frequencies, for example 300 Hz-6 kHz. Preferably, the sound pressure level of the sensor is adjustable. In this case, while searching for sound, the device 4 or 6 requires a mere 10 uW for operation. Once the sensor detects sound, it can wake the rest of the device 4 or 6 up, and the required sampling and FFT can be triggered.

A real-time experiment was performed. In the experiment, two parcels were used, a first parcel containing the first device 4 and a second parcel containing the second device 6. The parcels were handled separately first, then they were carried together with different means of transport, while the sound recordings of the first sensor 12 and the second sensor 14, and measurement data of the game rotation sensors comprised in the devices were continuously collected.

Figure 12:
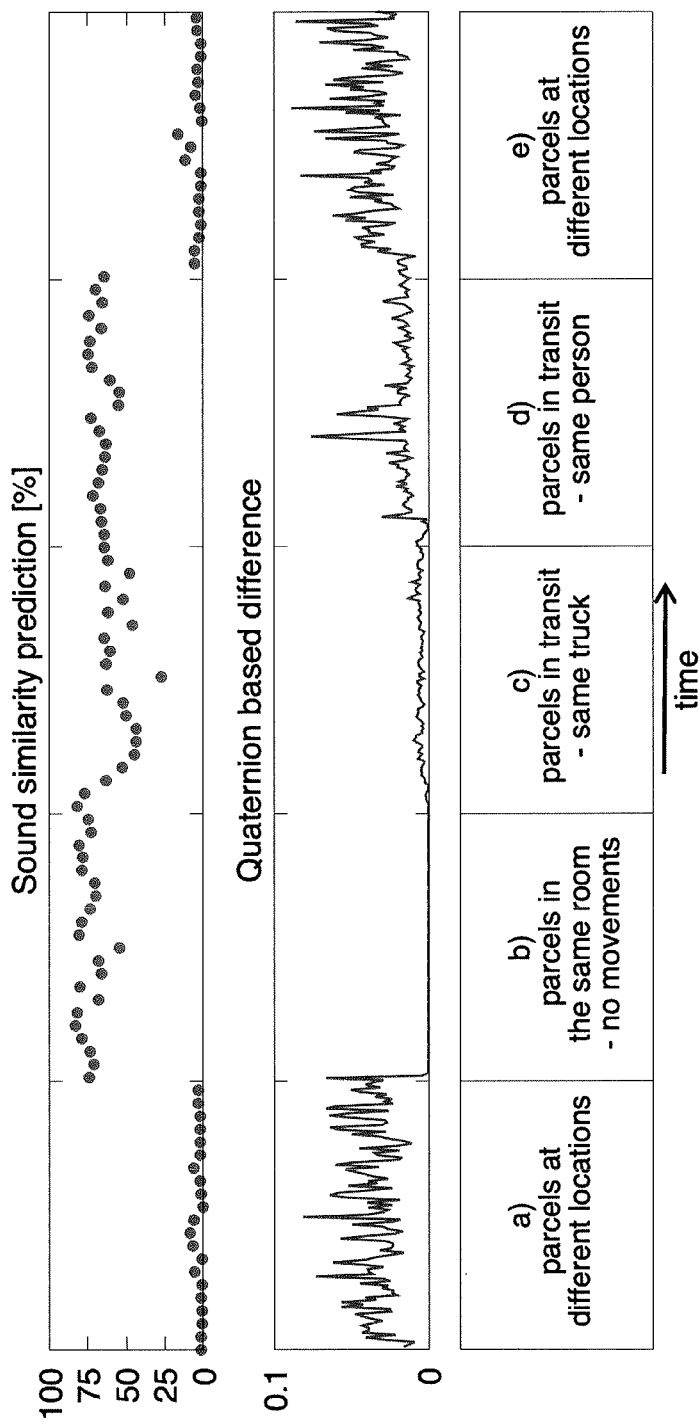
FIG. 12 illustrates experimental results based on sound and rotation measurements of two devices according to the present disclosure.

The results of this experiment are presented in FIG. 12. The sound similarity prediction is shown in the top row, the analyzed rotation quaternion-based difference in the middle row, while the bottom row shows the actual scenario. The sound similarity prediction values shown in FIG. 12 were obtained using the ANN described above with reference to FIGS. 9 to 11. The quaternion based difference is the Euclidean length of the rotational quaternion vector differences which was obtained as described with reference to FIG. 8.

In the first scenario a), the parcels were carried separately at different locations, then the parcels were placed for a while in the same room with no movement (see scenario b)), then the parcels were transported with a truck as shown in scenario c). In scenario d), a joint movement was performed by the parcels by carrying the parcels together by one person. In scenario e), two separate persons carried the two parcels at different locations.

For scenarios where the two parcels are co-located, the sound similarity prediction shows high prediction values (see scenarios b), c) and d)), while the opposite can be seen in scenarios a) and e), where the parcels were at different locations.

By investigating the quaternion-based differences one might see clear evidence of the parcels moving together (see scenarios b), c) and d)), due to the low difference values. On the other hand, the difference is high when the movement of the parcels is independent from each other as can be seen in scenarios a) and e).

Neither sound-based nor quaternion-based determination of the measure of proximity performed equally well every time. When there was no movement for example (see scenario b)), a sound-based determination can be reliably used. On the other hand, a sound-based determination does not provide high prediction values every time, only when there is a sufficient amount of common sound signals recorded by both the first sensor 10 and the second sensor 12. By combining independent sources, the confidence in successful co-location detection can be increased. In other words, the determination of the measure of proximity can be based on a first device signature which comprises not only the first parameter, but also the third parameter and based on a second device signature which comprises not only the second parameter, but also the fourth parameter. In this case, the first and the second sensor 10, 12 measure the same physical property, and the third and fourth sensor 14, 16 measure the same physical property which is different therefrom. Measurements of sensors measuring different physical properties yield a plurality of parameters which are included in the device signatures and improve the accuracy or reliability of the determination of the measure of proximity.

As a next example, the determination of the first parameter based on a measurement of an image sensor (i.e., a camera) as the first sensor 10 is given. A cheap, small resolution imaging sensor can be used as the first sensor 10 to sample surroundings of the first device 4. Note that the content of the image itself is not so important, such that low performance and quality requirements apply to optics and the image sensor. A possible solution is to apply a low quality 360-degree optics on top of a low-resolution image sensor. The captured image data can be directly converted to a RGB or HSV colorspace by the processor 18 or a microcontroller configured to perform image processing. As will be laid out below, the color histogram is used to determine the first parameter. The first device 4 does not to store the image, as the color histogram can be calculated on-the-fly during data read-out by the processor 18 or the microcontroller attached to the first sensor 10.

Features (i.e., parameters) characteristic of the measurement of the image sensor are extracted as the positions of dips and peaks in the color histogram. The extracted features may be analyzed by a local AI component such as an ANN implemented by the processor 18 of the first device 4, in order to recognize if the captured scene has changed, i.e. whether the first device 4 has been moved or not. The ANN is used to extract such a feature based on the color histogram, for example the weight of various color ranges, or the ratio or their weight with respect to each other.

Another AI component, such as an ANN, is implemented by the processor 32 of the apparatus 8 to detect if the first device 4 and the second device 6 are sharing the same location, since their color histograms do not differ significantly from each other. Here, as the another AI component, one might use two or more fully connected hidden layers which have been trained to check if two local AI components extracted similar features. Such hidden layers are for example described in "Artificial Intelligence for Humans, Volume 3: Deep Learning and Neural Networks" by Jeff Heaton (ISBN 1505714346).

In particular, the apparatus 8 is configured to determine the measure of proximity based on the first and second device signatures which contain a first and second parameter, respectively, wherein the first and the second parameter have been determined based on a color histogram. Of course, each of the first device 4 and the second device 6 needs to comprise at least one image sensor in order to determine the aforementioned parameters based on the respective color histogram.

Figure 13:
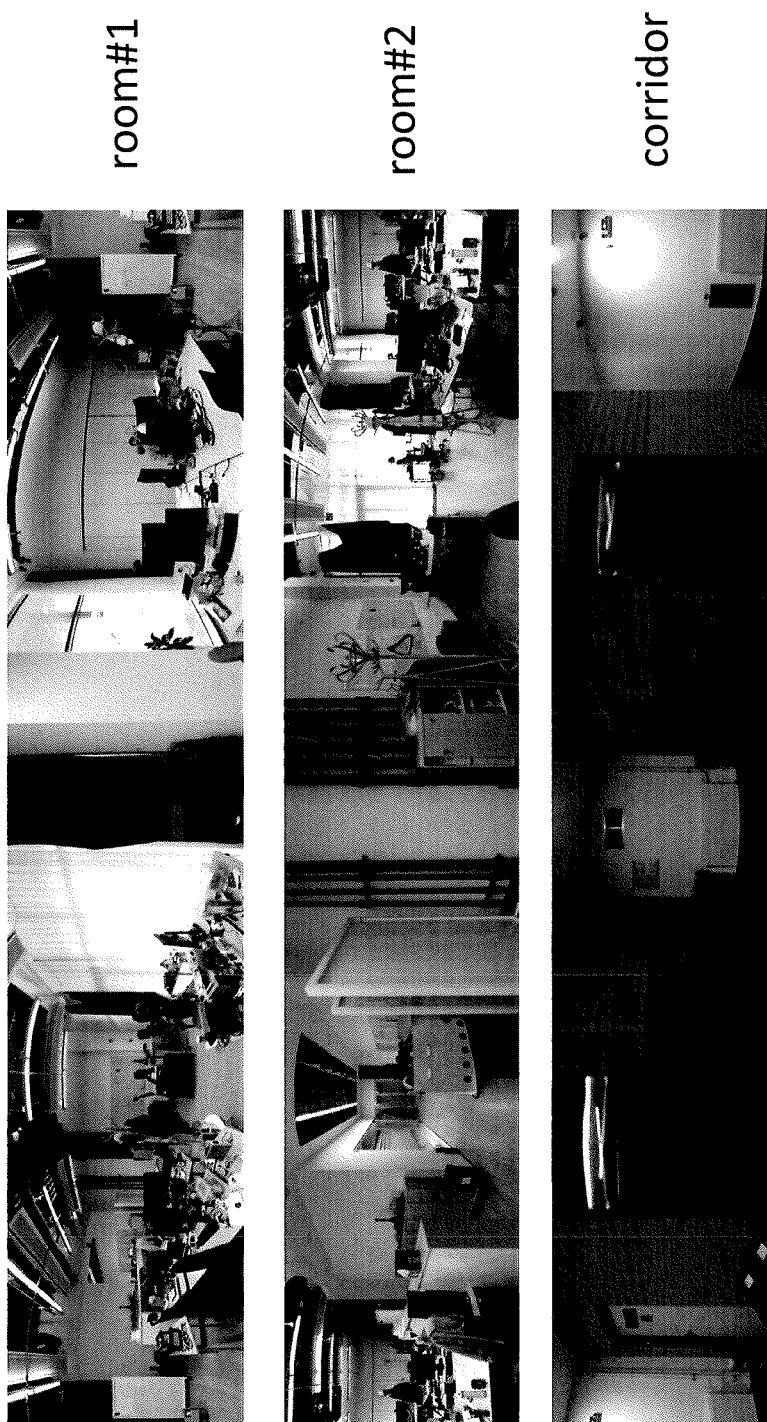
FIG. 13 illustrates three exemplary panoramic images acquired at different locations.

FIG. 13 shows three exemplary images acquired in different locations. The top two images denoted "room #1" and "room #2" were acquired at different locations in a same room, whilst the bottom image denoted "corridor" was acquired in a corridor separate from the room.

Figure 14:
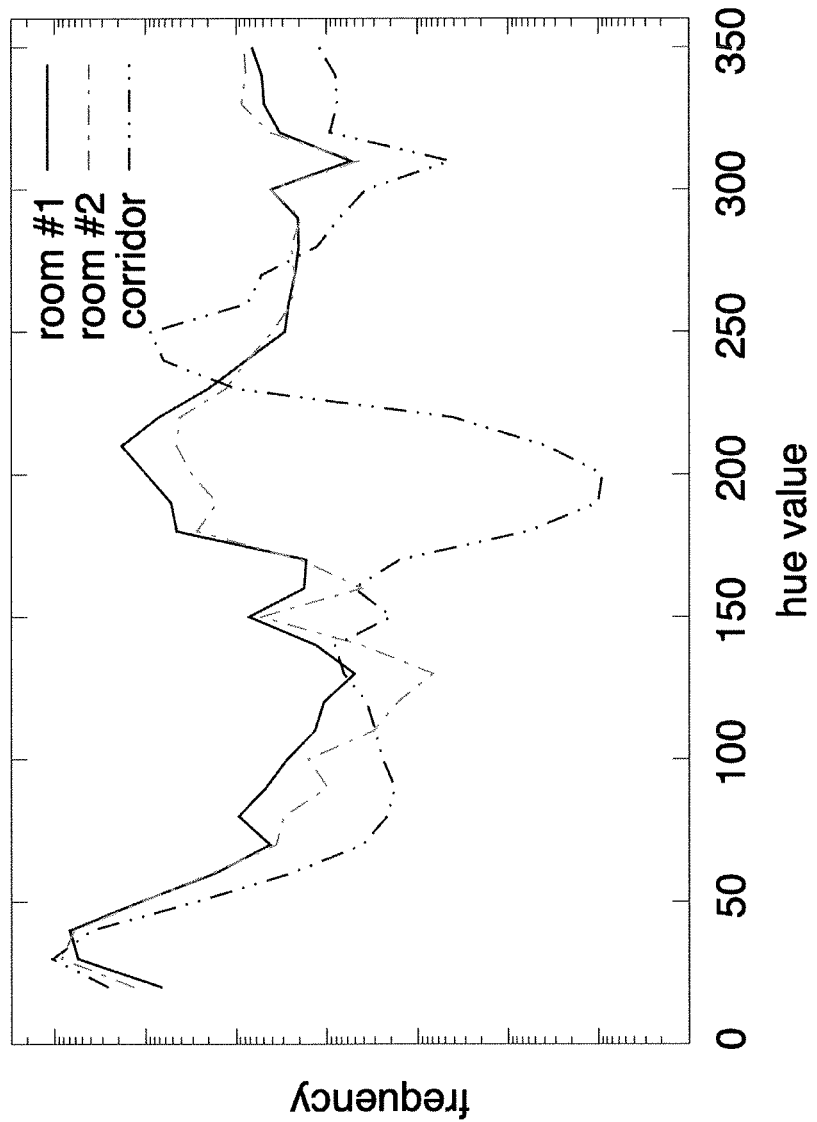
FIG. 14 illustrates colour histograms of the panoramic images of FIG. 13.

FIG. 14 shows color histogram curves generated based on the images shown in FIG. 13. The histograms of the images acquired in the same room are closely similar to one another, whilst the histogram of the image acquired in the corridor deviates therefrom significantly. In case the first parameter is extracted from the color histogram of the image "room #1" as a local maximum frequency at a hue value of ~212 and the second parameter is extracted from the color histogram of the image "room #2" as a local maximum frequency at a hue value of ~214, the apparatus 8 can determine that the first device 4 and the second device 6 are in the same room.

In case of the image acquired in the corridor, the first parameter may describe a local maximum frequency at a hue value of ~250 whilst the second parameter—as above—describes a local maximum frequency at a hue value of ~214. The apparatus 8 can then determine that the hue values of the first parameter and the second parameter are not closely similar, and that thus, the first device 4 and the second device 6 are not located within the same room.

Time correlation may also be performed by comparing the time points at which the images were acquired by the image sensors of the first and second device 4 and 6. In case the images were acquired within a predetermined time interval, for example within 1 minute, the apparatus 8 determines that due to the matched hue values of the first parameter and the second parameter, which are of the same parameter type, the first device 4 and the second device 6 are in the same room. In case of image acquired a longer time apart from each other, i.e., not within the predetermined time interval, the apparatus 8 may abort the determination of the measure of proximity or obtain one or more new device signatures. The apparatus 8 may send an instruction to one or both of the first device 4 and the second device 6 to generate a new device signature. For the determination of the measure of proximity, the frequency value at the local maximum frequency may also be comprised in the first parameter and the second parameter and compared with one another. Instead of local or global maxima or minima, certain patterns may be detected as the first and second parameters based on the color histogram. To this end, an ANN implemented by the processors 18, 26 can be used.

Figure 15:
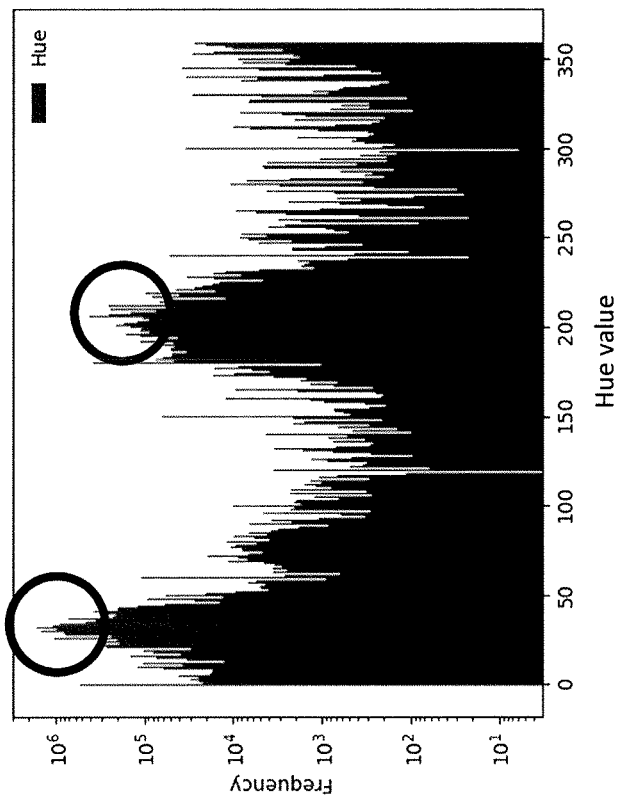
FIG. 15 illustrates two exemplary colour histograms.
Figure 15:
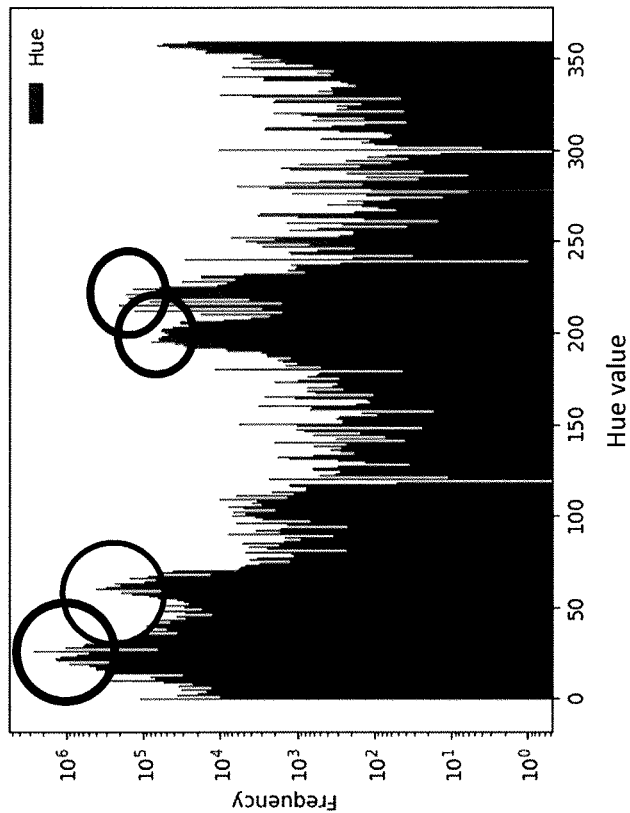

FIG. 15 shows two further color histograms generated from two other images. It can be seen that peaks are present in each histogram which may be extracted as the parameters characteristic of the images. In the shown example, peaks at hue values of ~30-45 are present in both histograms which would lead to a positive matching, i.e., a high correlation, of the first parameter with the second parameter, and thus to the determination that the first device 4 and the second device 6 are located in the same room or co-located.

In order to save power of the first device 4 and the second device 6 comprising image sensors, very low processing capable microcontrollers such as ARM Cortex-M devices may be used for image processing. There exist ultra-low power image sensors that consume less than 2 mW power with a reasonable pixel resolution of 320×240. They can be duty cycled to create 1 frame every 1 minute or so, in which case the average power consumption drops to approximately 1.1 µW, well within the feasible range for battery-based operation.

As has become apparent from the exemplary embodiments, the described technique herein allows a determination of the measure of proximity between the first device 4 and the second device 6 and, thus, a relative tracking of these two devices, even in case the devices are located inside a shipment container, a room, a shelf of a storage facility, a back of a truck or any other contained (e.g., walled or boxed) environment.

As "slim" device signatures of the devices 4 and 6 can be correlated with one another by the server 54, no complete records of sensor measurement data needs to be transmitted from the devices 4, 6, thereby saving power of the devices 4, 6 and transmission resources. The correlation of the device signatures is faster than a correlation of complete sets of measurement data which enables a fast location of the devices based on the device signatures. In case the device signatures each comprise multiple parameters determined based on measurements from different sensor types, the determination of the measure of proximity is even more reliable. By providing a signal emitting unit which emits a known physical signal, an absolute position of the first device 4 may be determined based on the device signatures.

While the invention has been described with reference to exemplary embodiments, it will be apparent to the skilled person that these embodiments may be modified or supplemented in many ways. Therefore, the invention is only limited by the claims that follow.

The invention claimed is:

1. A method of determining a measure of proximity between a first device that is mobile and a second device, the method comprising:
   obtaining a first device signature comprising an indication of a first point in time and a first parameter associated with the first point in time, wherein the first parameter is characteristic of a first measurement performed by a first sensor comprised in the first device;
   obtaining a second device signature comprising an indication of a second point in time and a second parameter associated with the second point in time, wherein the second parameter is characteristic of a second measurement performed by a second sensor comprised in the second device; and
   determining, based on the first device signature and the second device signature, the measure of proximity between the first device and the second device.

2. The method of claim 1, wherein the determination of the measure of proximity is performed by an artificial neural network.

3. The method of claim 1, wherein the first measurement consists of a first amount of information and the first parameter consists of an amount of information lower than the first amount, and wherein the second measurement consists of a second amount of information and the second parameter consists of an amount of information lower than the second amount.

4. The method of claim 1, wherein determining the measure of proximity comprises correlating the first device signature and the second device signature.

5. The method of claim 4, wherein the correlating comprises comparing the first point in time with the second point in time and comparing the first parameter with the second parameter.

6. The method of claim 4,
   wherein the first device signature further comprises an indication of a third point in time and a third parameter associated with the third point in time, wherein the third parameter is characteristic of a third measurement performed by a third sensor comprised in the first device; and
   wherein the second device signature further comprises an indication of a fourth point in time and a fourth parameter associated with the fourth point in time, wherein the fourth parameter is characteristic of a fourth measurement performed by a fourth sensor comprised in the second device.

7. The method of claim 6, wherein the correlating further comprises comparing the third point in time with the fourth point in time, and comparing the third parameter with the fourth parameter.

8. The method of claim 1, wherein the first device signature and the second device signature each comprise at least one further entry chosen from:
   an indication of the number of parameters comprised in the device signature;
   an indication of the sensor type of the sensor that performed the measurement;
   an indication of a point in time at which the sensor started the measurement;
   an indication of a timespan between the point in time at which the measurement was started by the sensor and the point in time associated with the parameter indicated in the device signature; and
   an indication of the parameter type of the parameter included in the device signature.

9. The method of claim 1, wherein the first sensor and the second sensor are configured to measure a same physical property.

10. The method of claim 9, wherein the physical property is one of vibration, sound, light, acceleration, rotation, magnetic field or temperature.

11. The method of claim 1, wherein the first parameter and the second parameter are parameters of a same parameter type.

12. The method of claim 11, wherein the parameter type is one of a maximum value, a minimum value, a value above a predetermined threshold or a value below a predetermined threshold, wherein the value is a value of the measurement, a derivative of the measurement with respect to time, a Fourier-transform of the measurement, a quaternion of the measurement, a Mel spectrum of the measurement, a histogram of the measurement, or a wavelet-transform of the measurement.

13. The method of claim 1, wherein the first sensor is a camera and the first parameter is a value of a histogram of the first measurement by the camera, and wherein the second sensor is a camera in the second device and the second parameter is a value of a histogram of the second measurement by the camera in the second device.

14. The method of claim 13, wherein the histogram represents a color distribution of pixels contained in an image acquired by the camera as the first measurement.

15. The method of claim 1, wherein the first sensor is a microphone and the first parameter is a value of a Fourier-transform of the first measurement or a wavelet-transform of the first measurement, and wherein the second sensor is a microphone and the second parameter is of a same parameter type as the first parameter.

16. The method of claim 1, wherein the first sensor is a microphone and the first parameter is a value of the first measurement, the value describing a sudden temporal change in a spectrum of the first measurement, and wherein the second sensor is a microphone and the second parameter is of a same parameter type as the first parameter.

17. The method of claim 1, wherein the first sensor is a microphone and the first parameter is a value of a Mel spectrogram of the first measurement, and wherein the second sensor is a microphone and the second parameter is of a same parameter type as the first parameter.

18. The method of claim 1, wherein the first sensor is a gyroscope, an acceleration sensor or an inertial motion sensor, and wherein the first parameter is a value of the first measurement describing an amount of rotation of the first device measured by the first sensor, and wherein the second sensor is of a same sensor type as the first sensor and the second parameter is of a same parameter type as the first parameter.

19. An apparatus comprising a processor configured to:

obtain a first device signature comprising an indication of a first point in time and a first parameter associated with the first point in time, wherein the first parameter is characteristic of a first measurement performed by a first sensor comprised in a first device;

obtain a second device signature comprising an indication of a second point in time and a second parameter associated with the second point in time, wherein the second parameter is characteristic of a second measurement performed by a second sensor comprised in a second device; and determine, based on the first device signature and the second device signature, a measure of proximity between the first device and the second device.

20. A device comprising:

a first sensor configured to perform a first measurement and generate first measurement data based on the first measurement; and a processor configured to:

obtain the first measurement data from the first sensor;

determine, based on the first measurement data, a first parameter associated with a first point in time, wherein the first parameter is characteristic of the first measurement; and generate a first device signature comprising an indication of the first point in time and the first parameter.

* * * * *